(12) United States Patent
Yukumoto et al.

(10) Patent No.: US 8,780,376 B2
(45) Date of Patent: Jul. 15, 2014

(54) IMAGE PROCESSING APPARATUS AND IMAGE PROCESSING SYSTEM HAVING A FUNCTION TO COOPERATIVELY OUTPUT DOCUMENT DATA FOR WHICH A TOTAL LIMITED NUMBER OF OUTPUT TIMES IS SET

(75) Inventors: Reiji Yukumoto, Kanagawa (JP); Takahiko Hayashi, Tokyo (JP); Ayako Watanabe, Kanagawa (JP); Ryo Takemoto, Kanagawa (JP); Osamu Torii, Kanagawa (JP); Masafumi Nagao, Kanagawa (JP); Yasukiyo Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 243 days.

(21) Appl. No.: 13/303,202

(22) Filed: Nov. 23, 2011

(65) Prior Publication Data

US 2012/0133970 A1 May 31, 2012

(30) Foreign Application Priority Data

Nov. 30, 2010 (JP) ................................. 2010-267734

(51) Int. Cl.
*G06K 15/02* (2006.01)
(52) U.S. Cl.
USPC .......................... 358/1.14; 358/1.13; 358/1.15
(58) Field of Classification Search
USPC ............................................... 358/1.13–1.15
See application file for complete search history.

(56) References Cited

U.S. PATENT DOCUMENTS

| | | | | |
|---|---|---|---|---|
| 2005/0109810 A1* | 5/2005 | Mkrtchyan et al. | ............. | 225/93 |
| 2007/0229914 A1* | 10/2007 | Matsuzawa et al. | .......... | 358/474 |
| 2009/0128845 A1* | 5/2009 | Seo | ............... | 358/1.15 |
| 2010/0037286 A1* | 2/2010 | Cain | ................................. | 726/1 |
| 2010/0195144 A1* | 8/2010 | Kawai | .......................... | 358/1.15 |
| 2011/0004789 A1* | 1/2011 | Tsujimoto | ....................... | 714/18 |

FOREIGN PATENT DOCUMENTS

| | | | |
|---|---|---|---|
| JP | 6-332642 A | 12/1994 | |
| JP | 2004-230603 A | 8/2004 | |
| JP | 2005-144764 A | 6/2005 | |

OTHER PUBLICATIONS

Machine translation for JP 2004-230603, IDS.*
Machine translation for JP 2005-144764, IDS.*

* cited by examiner

*Primary Examiner* — Qian Yang
(74) *Attorney, Agent, or Firm* — Harness, Dickey & Pierce, P.L.C.

(57) ABSTRACT

Disclosed is an image processing apparatus having a function to cooperatively output, via a cooperative image processing apparatus, document data, including a data sending unit that sends to the cooperative image processing apparatus the document data to be output, for which the total limited number of output times is set, with output setting information including an allocated number of output times for the document data individually allocated for the cooperative image processing apparatus; and a number updating unit that updates the total limited number of output times set for the document data based on the allocated number of output times by subtracting the allocated number of output times from the total limited number of output times, when the data sending unit sends the document data with the output setting information to the cooperative image processing apparatus.

11 Claims, 24 Drawing Sheets

FIG.10A

WITH PERAMANENT DEVICE ⌐11

| PERAMANENT DEVICE FOR DOCUMENT DATA (O/×) | REMAINING CAPACITY |
|---|---|
| O | 550MB |

FIG.10B

WITHOUT PERAMANENT DEVICE ⌐12

| PERAMANENT DEVICE FOR DOCUMENT DATA (O/×) | REMAINING CAPACITY |
|---|---|
| × | - |

FIG.13

| PROPERTY NAME | EXPLANATION |
|---|---|
| DOCUMENT NAME | NAME OF THE DOCUMENT |
| USER ID | ACTUAL USER WHO MADE THE DOCUMENT |
| USER NAME | USER NAME SHOWN ON THE PANEL |
| CREATED DATE | THE DOCUMENT ORIGINATION DATE |
| UPDATED DATE | THE LAST UPDATED DATE OF THE DOCUMENT |
| DOCUMENT PASSWORD | PASSWORD FOR THE DOCUMENT |
| PASSWORD SETTING | WHETHER PASSWORD IS SET TO THE DOCUMENT OR NOT |

| DOCUMENT DATA ID | OUTPUT LIMITING SETTING (ON/OFF) | TOTAL LIMITED OUTPUT NUMBER | DOCUMENT DATA |
|---|---|---|---|
| 1003 | ON | 300 | YES |
| 1004 | OFF | – | YES |
| 1005 | ON | 200 | YES |
| 1006 | ON | 5 | YES |
| ... | ... | ... | ... |

FIG.23B

| DOCUMENT DATA ID | OUTPUT LIMITING SETTING (ON/OFF) | TOTAL LIMITED OUTPUT NUMBER | DOCUMENT DATA |
|---|---|---|---|
| 1003 | ON | 295 | YES |
| 1004 | OFF | – | YES |
| 1005 | ON | 200 | YES |
| 1006 | ON | 5 | YES |
| ... | ... | ... | ... |

FIG.23C

| DOCUMENT DATA ID | OUTPUT LIMITING SETTING (ON/OFF) | TOTAL LIMITED OUTPUT NUMBER | DOCUMENT DATA |
|---|---|---|---|
| 1003 | ON | 296 | YES |
| 1004 | OFF | – | YES |
| 1005 | ON | 200 | YES |
| 1006 | ON | 5 | YES |
| ... | ... | ... | ... |

FIG.24A

| DOCUMENT DATA ID | JOB ID | OUTPUT LIMITING SETTING (ON/OFF) | INITIAL ALLOCATED NUMBER | OUTPUT | FAILURE | REMAINING NUMBER | SEND OUTPUT RESULT | DELETE DOCUMENT DATA |
|---|---|---|---|---|---|---|---|---|
| 1003 | 0100 | ON | 5 | 4 | 1 | 1 | NO | NO |
| ... | ... | ... | ... | ... | ... | ... | ... | ... |

FIG.24B

| DOCUMENT DATA ID | JOB ID | OUTPUT LIMITING SETTING (ON/OFF) | INITIAL ALLOCATED NUMBER | OUTPUT | FAILURE | REMAINING NUMBER | SEND OUTPUT RESULT | DELETE DOCUMENT DATA |
|---|---|---|---|---|---|---|---|---|
| 1003 | 0100 | ON | 5 | 4 | 1 | – | YES | NO |
| ... | ... | ... | ... | ... | ... | ... | ... | ... |

FIG.24C

| DOCUMENT DATA ID | JOB ID | OUTPUT LIMITING SETTING (ON/OFF) | INITIAL ALLOCATED NUMBER | OUTPUT | FAILURE | REMAINING NUMBER | SEND OUTPUT RESULT | DELETE DOCUMENT DATA |
|---|---|---|---|---|---|---|---|---|
| 1003 | 0100 | ON | 5 | 4 | 1 | – | YES | YES |
| ... | ... | ... | ... | ... | ... | ... | ... | ... |

IMAGE PROCESSING APPARATUS AND IMAGE PROCESSING SYSTEM HAVING A FUNCTION TO COOPERATIVELY OUTPUT DOCUMENT DATA FOR WHICH A TOTAL LIMITED NUMBER OF OUTPUT TIMES IS SET

BACKGROUND OF THE INVENTION

1. Field of the Invention

The present invention relates to an image processing apparatus and an image processing system and more specifically, to an image processing apparatus and an image processing system that perform an output operation of outputting document data for which the number of output times is limited.

2. Description of the Related Art

It is disclosed in Japanese Laid-open Patent Publication NO. 2004-230603 that the total number of times of printing that an image data is allowed to be printed without designation of the user or the number of times that the printing can be performed by each user with respect to the image data to be printed is stored in the nonvolatile memory of the image forming apparatus.

Further, it is disclosed in Japanese Laid-open Patent Publication NO. H06-332642 that plural image forming apparatuses, including a host apparatus by which operations are input and other print servers, are connected with each other via a network to form a network system so that images are output from those apparatuses.

However, when using the network system as disclosed in Japanese Laid-open Patent Publication NO. H06-332642, there is a problem that the number of times of printing the image data printed by the print server cannot be determined by the host apparatus if the communication with the host apparatus and the print server is disconnected while the image data is being output by the print server. When such a case occurs, the total remaining number of times of printing that the image data is allowed to be printed cannot be properly controlled.

SUMMARY OF THE INVENTION

The present invention is made in light of the above problems, and may provide an image processing apparatus and an image processing system capable of controlling the number of output times of document data for which a number of output times is limited.

The present invention has been made based on the knowledge the inventors have thus obtained and has the following configurations.

According to an embodiment, there is provided an image processing apparatus having a function to cooperatively output, via a cooperative image processing apparatus, document data for which a total limited number of output times is set, including: a data sending unit that sends to the cooperative image processing apparatus the document data to be output, for which the total limited number of output times is set, with output setting information including an allocated number of output times for the document data individually allocated for the cooperative image processing apparatus; and a number updating unit that updates the total limited number of output times set for the document data based on the allocated number of output times for the document data individually allocated for the cooperative image processing apparatus by subtracting the allocated number of output times from the total limited number of output times, when the data sending unit sends the document data with the output setting information to the cooperative image processing apparatus.

According to another embodiment, there is provided an image processing apparatus having a function to cooperatively output document data for which a total limited number of output times is set with a host image processing apparatus, including: a data storing unit that stores document data to be output with output setting information including an allocated number of output times for the document data individually allocated for the image processing apparatus sent from the host image processing apparatus; an output unit that outputs the document data; a number updating unit that updates the allocated number of output times by subtracting the number of output times every time the document data stored in the data storing unit is output by the output unit; and a communication unit that sends the output result of the document data including the updated allocated number of output times updated by the number updating unit to the host image processing apparatus.

According to another embodiment, there is provided an image processing system including a host image processing apparatus and a cooperative image processing apparatus, and having a cooperative output function in which output of a document data, for which a total limited number of output times for limiting the number of output times is set, is cooperatively performed by the host image processing apparatus and the cooperative image processing apparatus. The host image processing apparatus includes: a data sending unit that sends to the cooperative image processing apparatus document data to be output, for which the total limited number of output times is set, with output setting information including an allocated number of output times for the document data individually allocated for the cooperative image processing apparatus; and a number updating unit that updates the total limited number of output times set for the document data based on the allocated number of output times individually allocated for the cooperative image processing apparatus by subtracting the allocated number of output times from the total limited number of output times, when the data sending unit sends the document data with the output setting information to the cooperative image processing apparatus. The cooperative image processing apparatus includes: a data storing unit that stores the document data to be output with the output setting information sent from the host image processing apparatus; an output unit that outputs the document data; a number updating unit that updates the allocated number of output times by subtracting the number of output times every time the document data stored in the data storing unit is output; and a communication unit that sends the output result of the document data including the updated allocated number of output times updated by the number updating unit to the host image processing apparatus.

BRIEF DESCRIPTION OF THE DRAWINGS

Other objects, features and advantages of the present invention will become more apparent from the following detailed description when read in conjunction with the accompanying drawings.

FIGS. 10A and 10B are drawings showing examples of the status of the permanent storage area;

FIG. 13 is a drawing showing an example of the properties of the document data;

FIGS. 23A to 23C are drawings showing another example of the total limited number of output times set for each of the document data sets; and FIGS. 24A to 24C are drawings showing an example of the remaining allocated number of output times for the document data allocated for the cooperative apparatus.

DETAILED DESCRIPTION OF THE PREFERRED EMBODIMENTS

Figure 1:
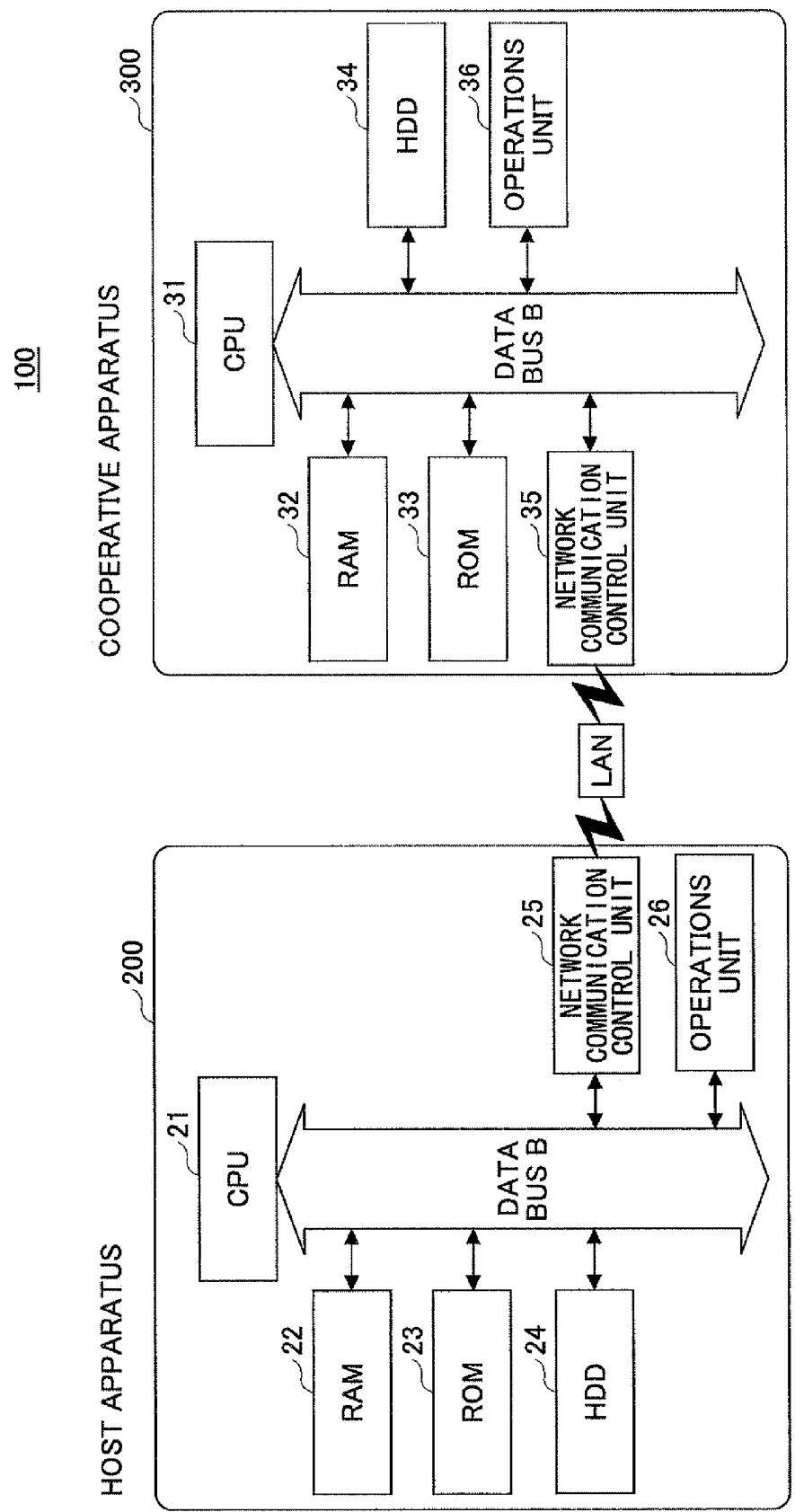
FIG. 1 is a block diagram showing the system structure and the hardware structure of the image processing system according to an embodiment.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to the drawings.

It is to be noted that, in the explanation of the drawings, the same components are given with the same reference numerals, and explanations are not repeated.

In the following embodiments, the document data for which a number of output times are limited and stored in a host apparatus is output by a cooperative apparatus connected to the host apparatus via a network or the like. The total limited number of output times for the document data is set in the host apparatus. When the cooperative apparatus outputs the document data, a limited number of output times for the document data individually allocated to the cooperative apparatus is also sent to the cooperative apparatus with the document data by the host apparatus. At the host apparatus, the total limited number of output times for the document data is updated by subtracting the allocated number for the document individually allocated to the cooperative apparatus when sending such an allocated number and the document data to the cooperative apparatus. The cooperative apparatus counts the actual output times of outputting the document data and sends the output result to the host apparatus. With this operation, the number of output times by the cooperative apparatus for the document data can be properly controlled.

First Embodiment

The structure of an image processing system according to the first embodiment will be described below with referring drawings.

FIG. 1 is a block diagram showing the system structure and the hardware structure of the image processing system according to the first embodiment.

The image processing system 100 of this embodiment includes a host image processing apparatus 200 and a cooperative image processing apparatus 300 connected with each other via a network such as a LAN (Local Area Network).

In this embodiment, the host image processing apparatus 200 and the cooperative image processing apparatus 300 perform a cooperative output operation of outputting a document data where the host image processing apparatus 200 functions as a host apparatus and the cooperative image processing apparatus 300 functions as a cooperative apparatus that outputs the document data in accordance with the instruction to output the document data by the host apparatus. Hereinafter, the host image processing apparatus 200 is referred to as a host apparatus 200 and the cooperative image processing apparatus 300 is referred to as a cooperative apparatus 300.

In this embodiment, the host apparatus 200 and the cooperative apparatus 300 cooperate with each other to perform a series of image processing operations and the like. The image processing system 100 may include plural cooperative apparatuses similar to the cooperative apparatus 300 although only the cooperative apparatus 300 is shown in this embodiment.

First, the hardware structure of the host apparatus 200 will be explained. The host apparatus 200 includes a CPU (Central Processing Unit) 21, a RAM (Random Access Memory) 22, a ROM (Read Only Memory) 23, a HDD (Hard Disk Drive) 24, a network communication control unit 25, and an operations unit 26 connected through a data bus B.

The CPU 21 controls all of the host apparatus 200. The RAM 22 temporarily stores data. The ROM 23 stores programs, font data, and other static data. The HDD 24 stores non-volatile data. The network communication control unit 25 is connected to a network such as an Ethernet (registered trademark) or a wireless LAN to enable the communications with external devices or servers. The operations unit 26 provides a user interface such as keys or an input image for inputting text by which a user of the host apparatus 200 operates the host apparatus 200.

The function of the host apparatus 200 may be actualized by the hardware structure and an image processing program. The CPU 21 may read out the image processing program stored in the ROM 23, for example, and execute the image processing program held in the RAM 22 to perform the function of the host apparatus 200. The image processing program may be downloaded via the network by the network communication control unit 25. Alternatively, the image processing program may be stored in a readable recording medium such as an USB (Universal Serial Bus) memory, an optical disk or the like and read out to be stored in the ROM 23.

Next, the hardware structure of the cooperative apparatus 300 will be explained. The cooperative apparatus 300 includes a CPU 31, a RAM 32, a ROM 33, a HDD 34, a network communication control unit 35, and an operations unit 36 connected through a data bus B. The CPU 31, the RAM 32, the ROM 33, the HDD 34, the network communication control unit 35, and the operations unit 36 of the cooperative apparatus 300 function similarly to those of the host apparatus 200, respectively, and the explanations are not repeated.

The host image processing apparatus 200 and the cooperative image processing apparatus 300 may be composed of a normal image processing apparatus such as an image forming apparatus but the function to perform the cooperative output operation as will be explained below is added, respectively.

Figure 2:
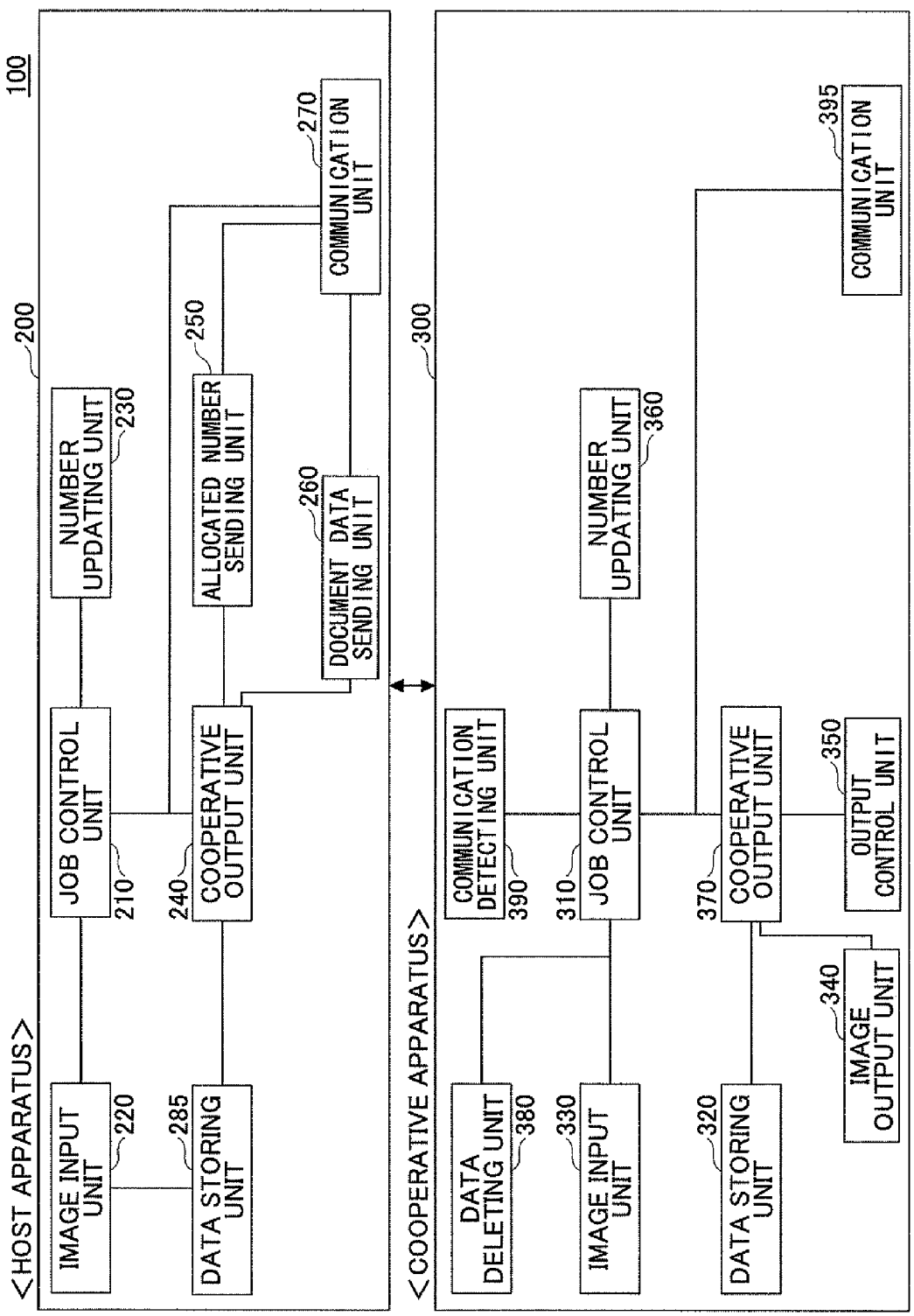
FIG. 2 is a block diagram showing functions of the host apparatus and the cooperative apparatus of the embodiment.

The functions of the host apparatus 200 and the cooperative apparatus 300 of this embodiment will be explained with reference to FIG. 2. FIG. 2 is a block diagram showing functions of the host apparatus 200 and the cooperative apparatus 300 of this embodiment.

The host apparatus 200 of the image processing system 100 according to this embodiment includes a job control unit 210, an image input unit 220, a number updating unit 230, a cooperative output unit 240, an allocated number sending unit 250, a document data sending unit 260, a communication unit 270, and a data storing unit 285.

The job control unit 210 controls a series of processing operations from data input to data output upon receiving instructions by a user. The image input unit 220 reads out the document data stored in the permanent storage area of the host apparatus 200. Here, "permanent storage area" may be, for example, the storage device such as the HDD 24 or the like of the host apparatus 200. The storage device as the HDD 24 is referred to as a permanent storage area in this application.

In this embodiment, the data storing unit 285 stores the document data. The data storing unit 285 may be composed of apart of the HDD 24 of the host apparatus 200. The image input unit 220 reads out the document data stored in the data storing unit 285.

The number updating unit 230 updates a total limited number of output times set for the document data stored in the host apparatus 200 based on the output status of the document data. The total limited number of output times for the document data may be stored in the data storing unit 285 or other area in the HDD 24 in connection with the document data. The operation of the number updating unit 230 will be explained later in detail.

The cooperative output unit 240 controls instructions of outputting a document data by another image processing apparatus, the cooperative apparatus 300 in this embodiment, under a cooperative output operation performed by the host apparatus 200 and the cooperative apparatus 300.

The document data sending unit 260 sends the document data to be cooperatively output by the cooperative apparatus 300 to the cooperative apparatus 300. The document data may be image data in this embodiment.

The allocated number sending unit 250 sends an allocated number of output times for the document data individually allocated for the cooperative apparatus 300 to the cooperative apparatus 300. The allocated number of output times may be included in the output setting information. In this embodiment, the document data sending unit 260 and the allocated number sending unit 250 function as a data sending unit and the output setting information may be sent with the document data. The output setting information will be explained later in detail.

The communication unit 270 sends and receives data to and from the cooperative apparatus 300 or other apparatuses via the network.

The cooperative apparatus 300 of the image processing system 100 according to the present embodiment includes a job control unit 310, a data storing unit 320, an image input unit 330, a image output unit 340, an output control unit 350, a number updating unit 360, a cooperative output unit 370, a data deleting unit 380, a communication detecting unit 390, and a communication unit 395.

The job control unit 310 controls a series of processing operations from data input to data output upon receiving instructions by a user.

The image input unit 330 stores the document data sent from the host apparatus 200 in the permanent storage area of the cooperative apparatus 300. Further, the image input unit 330 reads out the document data stored in the permanent storage area of the cooperative apparatus 300. Here, "permanent storage area" may be, for example, the storage device such as the HDD 34 or the like of the cooperative apparatus 300.

In this embodiment, the data storing unit 320 stores the document data. The data storing unit 320 may be composed of a part of the HDD 34 of the cooperative apparatus 300. The image input unit 330 stores the document data sent from the host apparatus 200 in the data storing unit 320 and reads out the document data stored in the data storing unit 320.

The image output unit 340 outputs (prints on a paper or the like, sends a facsimile to an assigned address, or the like) images after adjusting the image data such as the document data in accordance with the set conditions.

The output control unit 350 controls the output times of the document data for which the number of output times is limited. The output control unit 350 prevents the output of such a document when the number of times of the instruction to output the document exceeds the allocated number of output times for the document data allocated for the cooperative apparatus 300.

The number updating unit 360 updates the number of output times for the document data allocated for the cooperative apparatus 300 when the document data is output by the output unit 340.

The cooperative output unit 370 controls instructions of outputting the document data under the cooperative output operations performed by the host apparatus 200 and the cooperative apparatus 300.

The data deleting unit 380 deletes the document data stored in the data storing unit 320. The data deleting unit 380 determines whether to delete the document data sent from the host apparatus 200 and stored in the data storing unit 320 based on the communication status and the output result of the document data.

The communication detecting unit 390 detects whether the cooperative apparatus 300 is capable of communicating with the host apparatus 200 or other apparatuses.

The communication unit 395 sends and receives data to and from the host apparatus 200 or other apparatuses via the network.

In the image processing system 100 of this embodiment, when the host apparatus 200 sends document data to be output to the cooperative apparatus 300 where the total number of output times that the document data is allowed to be output is limited, the host apparatus 200 sends output setting information including an allocated number of output times for the document data individually allocated for the cooperative apparatus 300 with the document data. Then, total limited number of times for the document data is updated based on the allocated number of output times for the document data individually allocated for the cooperative apparatus 300 by subtracting the allocated number of output times from the total limited number of output times.

In the cooperative apparatus 300, when the document data is output, the remaining number of output times is updated by counting the output time and subtracting the counted output time from the allocated number of output times. Further, in the cooperative apparatus 300, information whether the document data is successfully output or not may be recorded. Then, the output result including the actual output times, the remaining number of output times, the information whether the document data is successfully output or the like is sent to the host apparatus 200.

Therefore, in the host apparatus 200, the total limited number of output times can be updated by adding the number of output times once allocated to the cooperative apparatus 300 but actually not used in the cooperative apparatus 300. With this structure, consistency of the total limited number of output times set for the document data can be maintained even when the document data is output by the cooperative apparatus 300.

Figure 3:
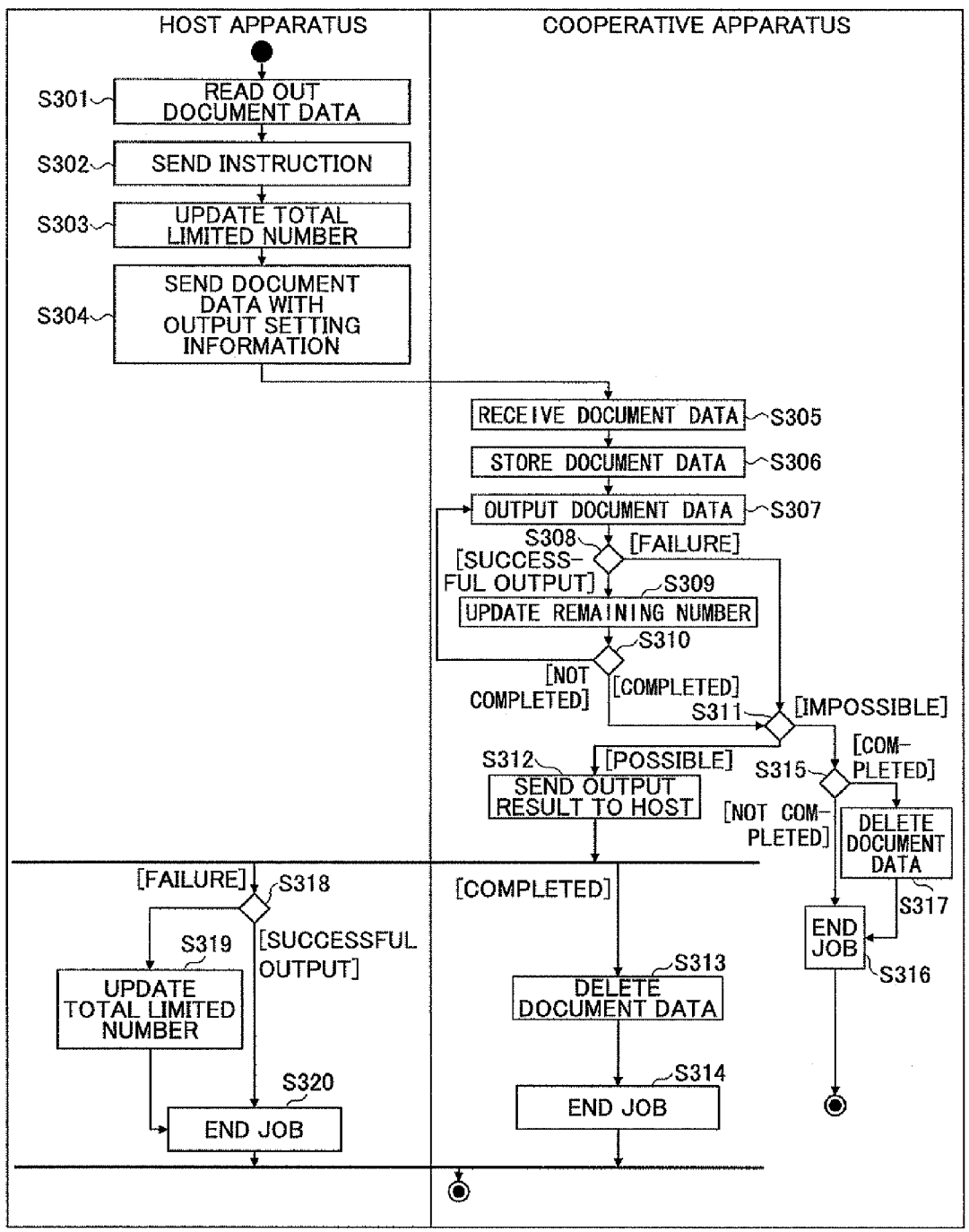
FIG. 3 is a flowchart showing the operations of the image processing system of the embodiment.

The operations of the image processing system 100 of this embodiment will be explained with reference to FIG. 3. FIG. 3 is a flowchart showing the operations of the image processing system 100 of the first embodiment.

In FIG. 3, the operation in which the document data, for which the total number of output times that the document data is allowed to be output is set, stored in the host apparatus 200 is read out and sent to the cooperative apparatus 300 to be output by the cooperative apparatus 300.

In the host apparatus 200 of the image processing system 100 according to the present embodiment, when the user instructs the host apparatus 200 to execute a cooperative output operation with the cooperative apparatus 300, the job control unit 210 instructs the image input unit 220 to read out the document data. The image input unit 220 reads out the document data from the data storing unit 285 (step S301).

The document data may be any data including image data obtained by digitizing a document or the like. The document data may not be previously stored in the data storing unit 285. The document data may be obtained and stored in the data storing unit 285 at this time by reading a document by a scanner or the like to form digital data, reading out from an external recording media or the like, or receiving from another device such as a personal computer or the like connected to the host apparatus 200 via the network.

The total number of output times that the document data is allowed to be output may be previously set or may be set by an authorized person such as an administrator or the like.

Further, at this time, the user may input the number of output times that the document data is to be output by the cooperative apparatus 300. Such a number becomes the allocated number of output times for the document data individually allocated for the cooperative apparatus 300.

Next, the cooperative output unit 240 sends an instruction of cooperative output to the cooperative apparatus 300 (step S302).

Thereafter, the number updating unit 230 updates the total limited number of output times set for the document data based on the allocated number of output times for the document data individually allocated for the cooperative apparatus 300 by subtracting the allocated number of output times from the total limited number of output times (step S303).

Then, the document data sending unit 260 sends the document data to the cooperative apparatus 300. At the same time, the allocated number sending unit 250 sends the output setting information including the allocated number of output times to the cooperative apparatus 300 (step S304). The output setting information is made to correspond with the document data, for example by a document ID or the like.

In the cooperative apparatus 300, the image input unit 330 receives the document data and the output setting information sent from the host apparatus 200 (step S305). Then, the data storing unit 320 stores the document data and the output setting information (step S306).

Thereafter, the image output unit 340 outputs the document data (step S307).

Thereafter, the cooperative output unit 370 determines whether the document data is successfully output or not (step S308). In this step S308, the output control unit 350 may determine whether the output of the document data was possible or not.

When output of the document data is possible and the document data is successfully output in step S308, the number updating unit 360 updates the remaining number of output times included in the output setting information (step S309). When, on the other hand, the output of the document data is impossible or the document data is not successfully output in step S308, the process proceeds to step S311 which will be explained later.

The cooperative output unit 370 determines whether the output of the document data for the allocated number of output times is completed (step S310). When the output of the document data is not completed in step S310, the process goes back to step S307.

When the output of the document is completed in step S310, the communication detecting unit 390 determines whether the communication with the host apparatus 200 is possible (step S311).

When the communication with the host apparatus 200 is possible in step S311, the communication unit 395 sends output result to the host apparatus 200 (step S312). When the output result is sent to the host apparatus 200, the data deleting unit 380 deletes the document data and its output setting information from the data storing unit 320 (step S313). The job control unit 310 ends the job (step S314).

When, on the other hand, the communication with the host apparatus 200 is impossible in step S311, the job control unit 310 determines whether the output of the document data is completed (step S315). Concretely, the job control unit 310 instructs the data deleting unit 380 to determine whether to delete the document data for which the number of output times is limited from the data string unit 320.

In step S315, same determination as that in step S310 is performed.

When the output of the document is not completed in step 315, the job control unit 310 ends the job (step S316). When, on the other hand, the output of the document is completed in step S315, the data deleting unit 380 deletes the corresponding document data from the data storing unit 320 (step S317). The output result may be maintained to be stored in the cooperative apparatus 300.

When the host apparatus 200 receives the output result from the cooperative apparatus 300 in step S312, the number updating unit 230 determines whether the document data is actually output by the cooperative apparatus 300 for the allocated number of output times (step S318). When it is determined that the document data is not actually output by the cooperative apparatus 300 for the allocated number of output times due to failure or the likes for example, in step S318, the number updating unit 230 adds the number of times that is not actually output by the cooperative apparatus 300 to the total limited number of output times set for the document data (step S319).

The output result may include the failure number of output times that indicates the number of times that the cooperative apparatus 300 could not output the document data because of failure. In such a case, the number updating unit 230 determines whether the failure number of output times is zero and updates the total limited number of output times set for the document data by adding the failure number of output times when the failure number of output times is not zero.

Alternatively, the output result may include the actual number of output times of the document data output by the cooperative apparatus 300. In such a case, the number updating unit 230 determines whether the actual number of output times of the document data output by the cooperative apparatus 300 is less than the allocated number of output times allocated to the cooperative apparatus 300 based on the output result sent from the cooperative apparatus 300, and updates the total limited number of output times set for the document data by adding the difference obtained by subtracting the actual number of output times from the allocated number of output times, when the actual number of output times is less than the allocated number of output times.

When, on the other hand, it is determined that the document data is successfully output by the cooperative apparatus 300 for the allocated number of output times in step S318, the job control unit 210 ends the job (step S320).

Figure 4:
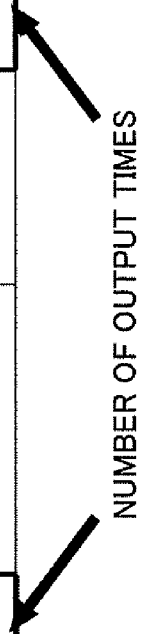
FIG. 4A is a drawing showing an example of the output setting information sent from the host apparatus to the cooperative apparatus.
FIG. 4B is a drawing showing an example of the output result sent from the cooperative apparatus to the host apparatus.

The updating process of the total limited number of output times by the host apparatus 200 and the remaining number by the cooperative apparatus 300 will be explained with reference to FIGS. 4A and 4B. FIGS. 4A and 4B are drawings for explaining these updating processes.

FIG. 4A shows an example of the output setting information sent from the host apparatus 200 to the cooperative apparatus 300. FIG. 4B shows an example of the output result sent from the cooperative apparatus 300 to the host apparatus 200.

The output setting information 41 as shown in FIG. 4A includes a job ID, information showing whether a print job is included or not (simply shown as "PRINT JOB"), the allocated number of printing sheets, information showing whether a sending job is included or not (simply shown as "SENDING JOB"), addresses to send the document data to (simply shown as "TO"), and information showing whether the number of output times is limited for the document data or not (simply shown as "OUTPUT LIMITED"), that correspond with each other.

The allocated number of output times means the number of output times included in the output setting information 41. In this example as shown in FIG. 4A, the allocated number of output times is a total number of the number of printing sheets and the number of addresses for sending the document data. Therefore, the allocated number of output times for the output setting information 41 becomes 5 where the number of printing sheets is "3" and the number of addresses for sending the document data is "2".

The output result 42 as shown in FIG. 4B is the output result of the document data set in the output setting information 41. The output result 42 includes a job ID, a result of print output, and a result of sending output, that correspond with each other. The result of the print output includes the number of times of successful printing and of failure. The result of the sending output includes the number of times of successful transmission and of failure. As for the example of the output result 42, the number of times of successful printing is three and the number of times of successful transmission is only one. Therefore, the total number of times of successful output becomes four and the total number of times of failing output becomes one.

Therefore, for the case shown in FIGS. 4A and 4B, when the host apparatus 200 sends the document data to the cooperative apparatus 300, the number updating unit 230 subtracts five, which is the number of output times included in the output setting information 41, from the total limited number of output times set for the document data and updates the total limited number of output times.

In the cooperative apparatus 300, the number updating unit 360 decreases the remaining number of output times as the image output unit 340 outputs the document data to form the output result 42.

Further in the host apparatus 200, the number updating unit 230 refers to the output result 42 sent from the cooperative apparatus 300 and updates the total limited number of output times. Concretely, the number updating unit 230 increases the total limited number of output times as equal as the total number of times of failing output.

Figure 5:
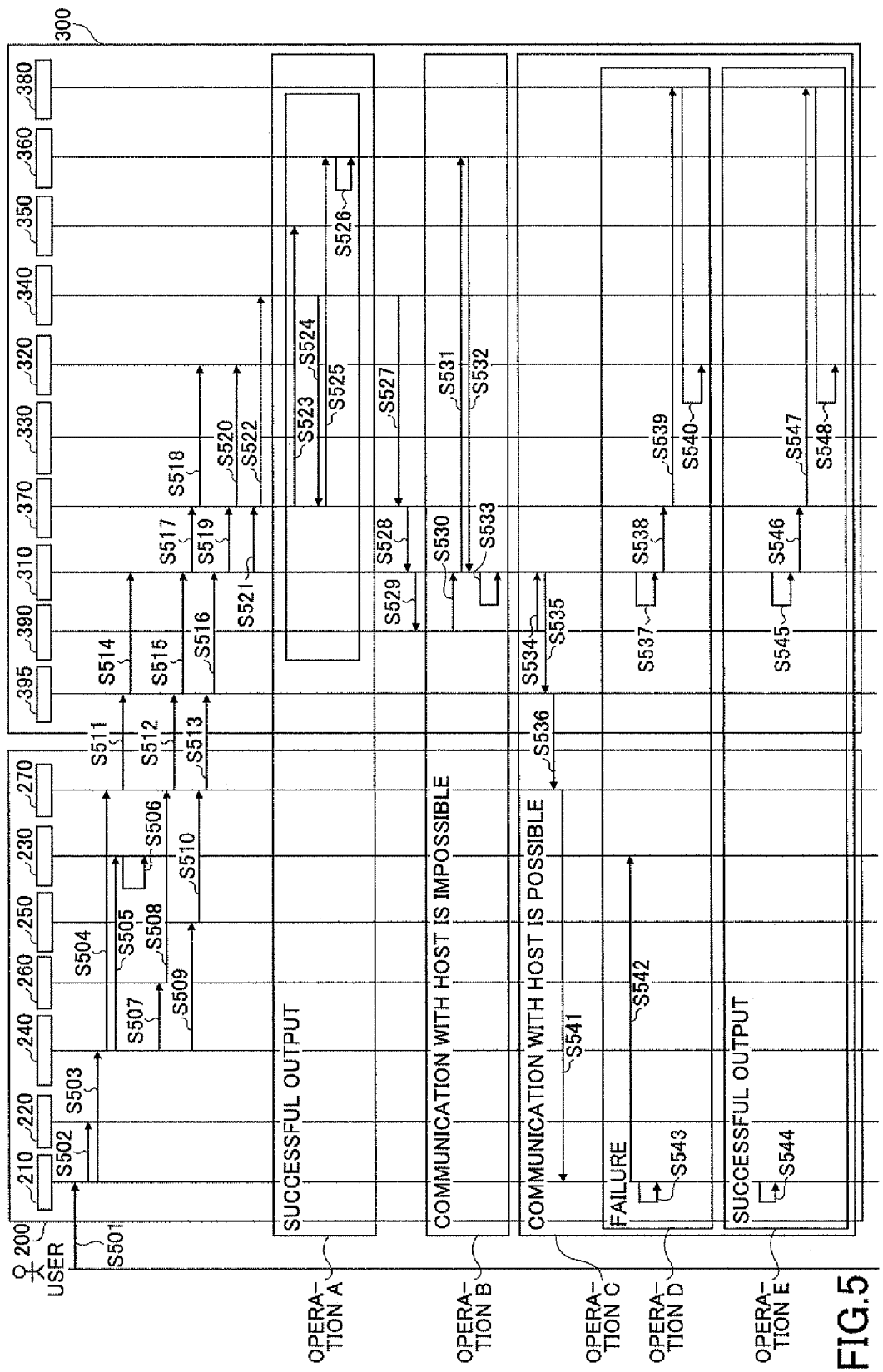
FIG. 5 is a sequence diagram showing the operations of the image processing system of the embodiment.

The operation of the image processing system 100 of this embodiment will further explained with reference to FIG. 5. FIG. 5 is a sequence diagram showing the operation of the image processing system 100 of the first embodiment.

In the image processing system 100, when the host apparatus 200 receives an instruction to execute a cooperative output operation from the user (step S501), the job control unit 210 instructs the image input unit 220 to read out the document data (step S502). The job control unit 210 also instructs the cooperative output unit 240 to output data including the output setting information 41 (step S503).

Upon receiving the instruction to output the data, the cooperative output unit 240 instructs the communication unit 270 to output the data (step S504). The cooperative output unit 240 also instructs the number updating unit 230 to update the total limited number of output times for the document data (step S505).

Upon receiving the instruction, the number updating unit 230 updates the total limited number of output times for the document data (step S506). Concretely, the number updating unit 230 subtracts the allocated number of output times for the document data allocated for the cooperative apparatus 300 included in the output setting information 41 as explained above from the total limited number of output times for the document data.

The cooperative output unit 240 instructs the document data sending unit 260 to send the document data (step S507). Upon receiving the instruction, the document data sending unit 260 instructs the communication unit 270 to send the document data (step S508).

The cooperative output unit 240 instructs the allocated number sending unit 250 to send the output setting information 41 (step S509). Upon receiving the instruction, the allocated number sending unit 250 instructs the communication unit 270 to send the output setting information 41 (step S510).

The communication unit 270 sends the instruction of cooperative output operations, the document data, and the output setting information 41 to the cooperative apparatus 300 (step S511, S512, and S513).

In the cooperative apparatus 300, the communication unit 395 receives the instruction of cooperative output operations, the document data, and the output setting information 41, and passes them to the job control unit 310 (step S514, S515, and S516).

The job control unit 310 instructs the cooperative output unit 370 to store the document data in the data storing unit 320 (step S517). Upon receiving the instruction, the cooperative output unit 370 stores the document data in the data storing unit 320 (step S518). The job control unit 310 also instructs the cooperative output unit 370 to store the output setting information 41 (step S519). Upon receiving the instruction, the cooperative output unit 370 stores the output setting information 41 in the data storing unit 320 (step S520).

Further, the job control unit 310 instructs the cooperative output unit 370 to output the document data (step S521). Upon receiving the instruction, the cooperative output unit 370 outputs the document data by the image output unit 340 (step S522).

In the following, the operations where the document data is successfully output by the cooperative apparatus 300, where the output of the document data is ended in failure, where the communication with the host apparatus 200 is possible, and where the communication with the host apparatus 200 is impossible will be explained.

The operation A is the operation of the cooperative apparatus 300 for the case when the document data is successfully output by the cooperative apparatus 300.

The output control unit 350 monitors the remaining limited number of output times included in the output setting information. The cooperative output unit 370 confirms with the output control unit 350 the remaining limited number of output times included in the output setting information (step S523).

The image output unit 340 reports the completion of each output of the document data to the cooperative output unit 370 (step S524). Upon receiving the report, the cooperative output unit 370 instructs the number updating unit 360 to update the number of output times (step S525). Upon receiving the instruction, the number updating unit 360 decreases the remaining number of output times in the output setting information 41 (step S526).

The cooperative apparatus 300 repeats the operations of step S523 to step S526 for the number of output times set in the output setting information 41.

When the operation A is finished and the output of the document data is completed, the image output unit 340 sends the output result of the document data to the cooperative output unit 370 (step S527). The cooperative output unit 370 passes the output result to the job control unit 310 (step S528). The job control unit 310 queries the communication detecting unit 390 whether the communication with the host apparatus 200 is possible (step S529).

The operation B from step S530 is the operation of the cooperative apparatus 300 for the case when the communication with the host apparatus 200 is impossible and the output at the cooperative apparatus 300 includes a failure.

When the communication with the host apparatus 200 is impossible, the communication detecting unit 390 reports this fact to the job control unit 310 (step S530). Upon receiving the report, the job control unit 310 queries to the number updating unit 360 whether the output at the cooperative apparatus 300 includes a failure (step S531). The number updating unit 360 determines whether the output at the cooperative apparatus 300 includes a failure based on the updated output result. When the number updating unit 360 determines that the output at the cooperative apparatus 300 includes a failure and reports that fact to the job control unit 310 (step S532), the job control unit 310 ends the job (step S533).

According to the image processing system 100 of the embodiment, the document data stored in the data storing unit 320 of the cooperative apparatus 300 is not deleted when the communication with the host apparatus 200 is impossible for the case where the output at the cooperative apparatus 300 includes a failure. With this structure, when the cooperative apparatus 300 receives an additional instruction to output the image data, the cooperative apparatus 300 can output the document data stored in the data storing unit 320.

In the case where the communication with the host apparatus 200 is impossible but the output at the cooperative apparatus 300 does not include a failure, the processes may be similarly performed as those of step S537 to step S540, which will be explained later.

The operation C from step S534 is the operation of the host apparatus 200 and the cooperative apparatus 300 for the case when the communication between the host apparatus 200 and the cooperative apparatus 300 is possible.

When the communication between the cooperative apparatus 300 and the host apparatus 200 is possible in step S529, the communication detecting unit 390 reports the job control unit 310 that the communication is possible (step S534). Upon receiving the report, the job control unit 310 passes the output result 42 to the communication unit 395 (step S535). The communication unit 395 sends the output result 42 to the host apparatus 200 (step S536).

The operation D from step S537 is the operation of the host apparatus 200 and the cooperative apparatus 300 for the case when the output at the cooperative apparatus 300 includes a failure.

The job control unit 310 ends the job (step S537). The job control unit 310 instructs the cooperative output unit 370 to delete the document data (step S538). Upon receiving the instruction, the cooperative output unit 370 instructs the data deleting unit 380 to delete the document data and the output setting information 41 stored in the data storing unit 320 (step S539). Upon receiving the instruction, the data deleting unit 380 deletes the document data and the output setting information 41 and ends the job (step S540).

In the host apparatus 200, when the communication unit 270 receives the output result 42, the communication unit 270 passes the output result 42 to the job control unit 210 (step S541).

When the output result 42 includes the information indicating some of the output is ended in failure, the job control unit 210 counts the number of times of the failure. The job control unit 210 reports the counted number of times of the failure to the number updating unit 230. The number updating unit increases the total limited number of output times for the document (step S542). Then, the job control unit 210 ends the job (step S543).

The operation E from step S544 is the operation of the cooperative apparatus 300 for the case when the output at the cooperative apparatus 300 does not include a failure.

When the output result 42 received in step S541 by the host apparatus 200 indicates that all of the allocated number of output times are successfully actually output at the cooperative apparatus 300, the job control unit 210 ends the job (step S544). The operations of the cooperative apparatus from step S545 to step S548 are similar to those from step S537 to step S540 as explained above and the explanations are not repeated.

As described above, according to the image processing system 100 of the embodiment, the host apparatus 200 also passes the control of the number of output times for the document data to the cooperative apparatus 300 when sending the document data to the cooperative apparatus 300 for the cooperative output operation. Then, the host apparatus 200 receives the actual number of output times for the document from the cooperative apparatus 300 when the cooperative apparatus 300 finishes outputting the document data. Thereafter, the host apparatus 200 updates the total limited number of output times for the document data based on the actual number of output times.

According to the above structure, the number of output times of the document data for which the number of output times is limited can be properly controlled in the entirety of the image processing system 100.

FIGS. 23A to 23C are tables showing another example of the total limited number of output times set for each of the document data sets. The host apparatus 200 may include a table including the total limited number of output times set for each of the document data sets as shown in FIGS. 23A to 23C stored in the HDD 24.

The table may include items such as "DOCUMENT DATA ID" indicating the ID or name of the document data to be in connection with the document data, "OUTPUT LIMITING SETTING" indicating whether the output times for the document data is limited or not, "TOTAL LIMITED OUTPUT NUMBER" indicating the total limited number of output times set for the document data, "DOCUMENT DATA" indicating whether the document data is stored in the data storing unit 285 or not, and the like.

For example, referring to FIG. 23A, as for the document data with the document data ID of "1003", the output is limited, the total limited number of output times is "300", and the document data is stored in the data storing unit 285. As for the document data with the document data ID of "1004", the output is not limited and therefore the total limited number of output times is not set.

When the document data with the document data ID of "1003" is to be output by the cooperative apparatus 300 with the allocated number of output times of "five", the number updating unit 230 updates the total limited number of output times to "295" as shown in FIG. 23B by subtracting the allocated number of output times of "five" from the previously set total limited number of output times of "300".

When the host apparatus 200 receives the output result from the cooperative apparatus 300 indicating that the number of times of failing output is one as explained above with reference to FIG. 4B, the number updating unit 230 updates the total limited number of output times to "296" as shown in FIG. 23C by adding "one" to the previously set total limited number of output times of "295".

FIGS. 24A to 24C are tables showing an example of the remaining allocated number of output times for the document data allocated for the cooperative apparatus 300 included in the output setting information sent to the cooperative apparatus 300. The cooperative apparatus 300 may include a table including the limited number of output times for the document data allocated for the cooperative apparatus 300 as shown in FIGS. 24A to 24C stored in the HDD 34.

The table may include items such as "DOCUMENT DATA ID" indicating the ID or name of the document data to be in connection with the document data, "JOB ID" indicating the ID of the job, "OUTPUT LIMITING SETTING" indicating whether the output for the document data is limited or not, "INITIAL ALLOCATED NUMBER" indicating the allocated number of output times for the document data initially allocated for the cooperative apparatus 300, "OUTPUT" indicating the number of actual or successful output times, "FAILURE" indicating the number of failures, "REMAINING NUMBER" indicating the remaining allocated number of output times, "SEND OUTPUT RESULT" indicating whether the output result is sent to the host apparatus 200 or not, "DELETE DOCUMENT DATA" indicating whether the document data stored in the data storing unit 320 is deleted or not, and the like.

For example, referring to FIG. 24A, as for the document data with the document data ID of "1003", the output times is limited, the initially allocated number of output times is "five", successful output times is "four", and failing output times is "one". Therefore, as for this document data, the remaining allocated number of output times becomes "one" which is equal to the number obtained by subtracting the successful output times from the initially allocated number of output times. Further, as for this document data, the output result is not yet sent to the host apparatus 200 and the document data is not deleted from the document storing unit 320.

When the output result is sent to the host apparatus 200, the table is updated as shown FIG. 24B. Further, when the document data is deleted from the document storing unit 320, the table is updated as shown FIG. 24C.

The tables may not include all of the items as shown in FIGS. 23A to 24C, or FIGS. 24A to 24C.

Second Embodiment

The second embodiment will be explained in the following. In the second embodiment, only the operation for the case when the output result that is not sent to the host apparatus is retained in the cooperative apparatus is different from the operations of the first embodiment. Therefore, only the operations different from those of the first embodiment will be explained and explanations of the same operations are not repeated.

Figure 6:
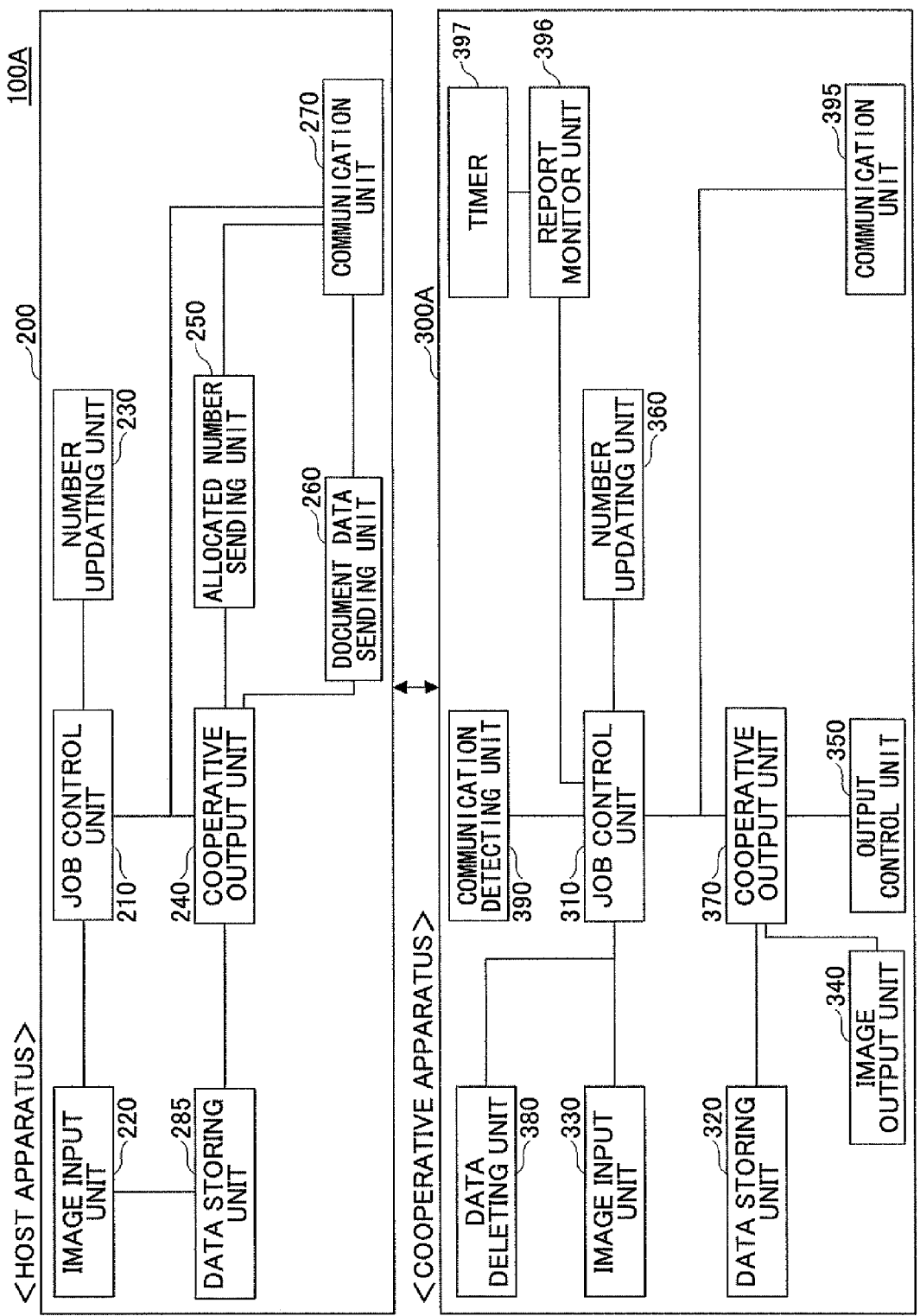
FIG. 6 is a block diagram showing functions of the host apparatus and the cooperative apparatus of another embodiment.

FIG. 6 is a block diagram showing the functions of the host apparatus and the cooperative apparatus composing the image processing system of the second embodiment.

In an image processing system 100A of this embodiment, the host apparatus 200 and a cooperative apparatus 300A are connected via the network or the like.

The cooperative apparatus 300A of this embodiment further includes a report monitor unit 396 and a timer 397 in addition to the components included in the cooperative apparatus 300 of the first embodiment.

The report monitor unit 396 determines whether there is any output result that is not yet sent to the host apparatus 200 or not in the cooperative apparatus 300A. The report monitor unit 396 may refer to the table as shown in FIGS. 24A to 24C and determines whether there is any output result that is not yet sent to the host apparatus 200 or not based on information stored as the item "SEND OUTPUT RESULT". The timer 397 counts a predetermined period or the like.

Figure 7:
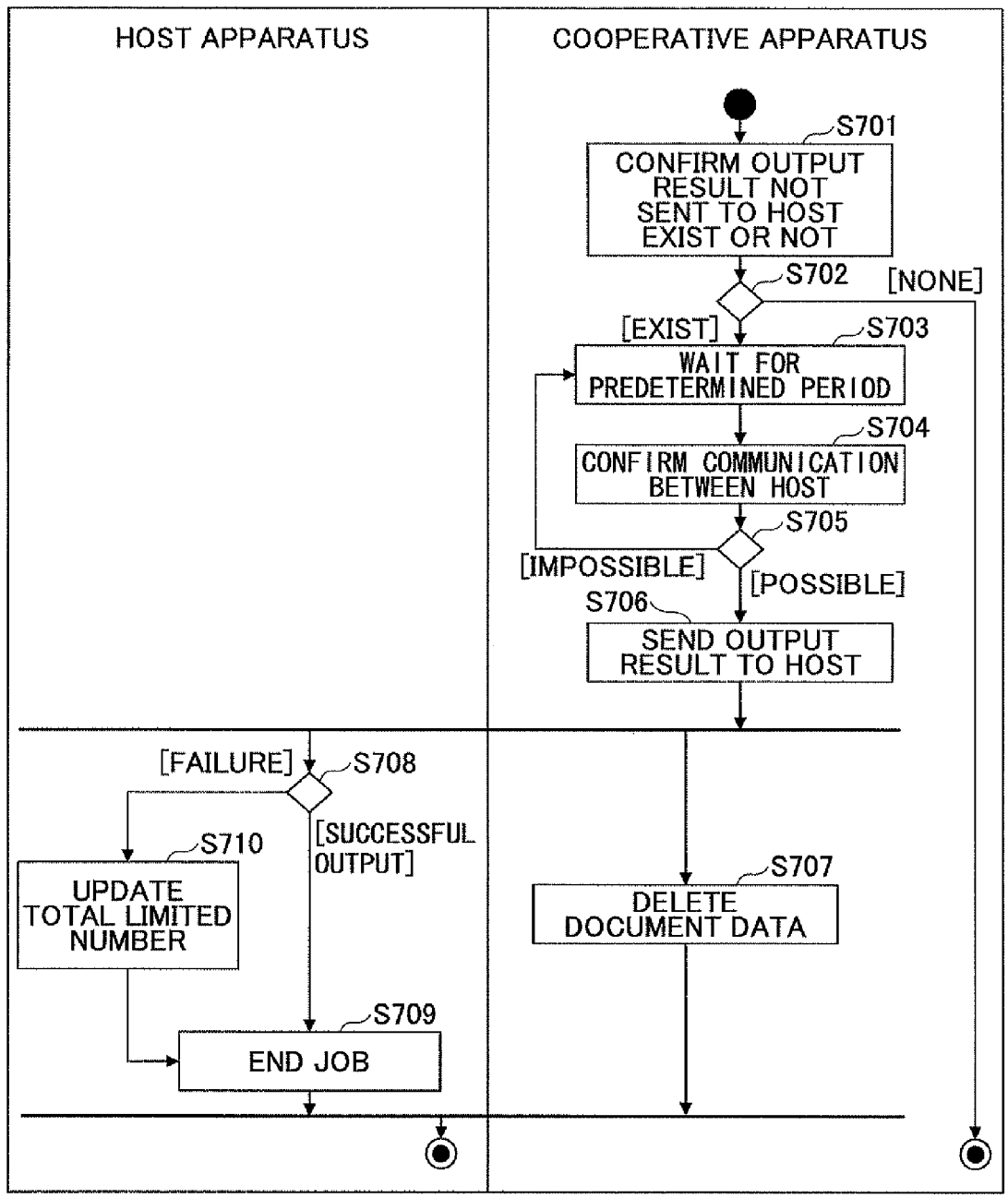
FIG. 7 is a flowchart showing the operations of the image processing system of the embodiment.

The operations of the image processing system 100A of this embodiment will be explained with reference to FIG. 7. FIG. 7 is a flowchart showing the operations of the image processing system 100A of the second embodiment.

In the cooperative apparatus 300A of this embodiment, the report monitor unit 396 determines whether there is any output result that is not sent yet to the host apparatus 200 after the cooperative output operation is finished (step S701 and step S702). When there is no output result that is not sent yet to the host apparatus 200 (step S702), the cooperative apparatus 300A ends the job.

When, on the other hand, there exists any output result that is not sent yet to the host apparatus 200 in step S702, the report monitor unit 396 sets a predetermined period to the timer 397 and waits (step S703). The predetermined period may be previously determined and set in the cooperative apparatus 300A.

After the predetermined period, in the cooperative apparatus 300A, the communication detecting unit 390 confirms whether the communication with the host apparatus 200 is possible (step S704). When the communication with the host apparatus 200 is impossible (step S705), and the operation of the cooperative apparatus 300A returns back to step S703 and wait for the predetermined period.

When the communication with the host apparatus 200 is possible in step S705, the cooperative apparatus 300A communicates with the host apparatus 200, the communication unit 395 sends the output result to the host apparatus 200 (step S706).

In the cooperative apparatus 300A, when the output result is sent to the host apparatus 200, the data deleting unit 380 deletes the document data stored in the data storing unit 320 (step S707). Here, the document data means that corresponding to the output result sent to the host apparatus this time.

Upon receiving the output result from the cooperative apparatus 300A, the host apparatus 200 determines whether the document data is output by the cooperative apparatus 300A for the allocated number of output times or not (step S708). When it is determined that the document data is successfully output by the cooperative apparatus 300A for the allocated number of output times in step S708, the job control unit 210 ends the job (step S709).

When, on the other hand, it is determined that the document data is not actually output by the cooperative apparatus 300A for the allocated number of output times, due to the failure or the likes for example, in step S708, the number updating unit 230 adds the number of times that the document data is not actually output by the cooperative apparatus 300A to the total limited number of output times set for the document data (step S710). Then, the job control unit 210 ends the job (step S709).

According to the image processing system 100A of the embodiment, the output result can be automatically sent to the host apparatus even when the communication with the host apparatus 200 and the cooperative apparatus 300A is temporarily shut off before the output result is sent to the host apparatus.

Third Embodiment

The third embodiment will be explained in the following. In the third embodiment, only the operation of considering the available capacity of the permanent storage area of the cooperative apparatus is different from the operations of the first embodiment. Therefore, only the operations different from those of the first embodiment will be explained and explanations of the same operations are not repeated.

Figure 8:
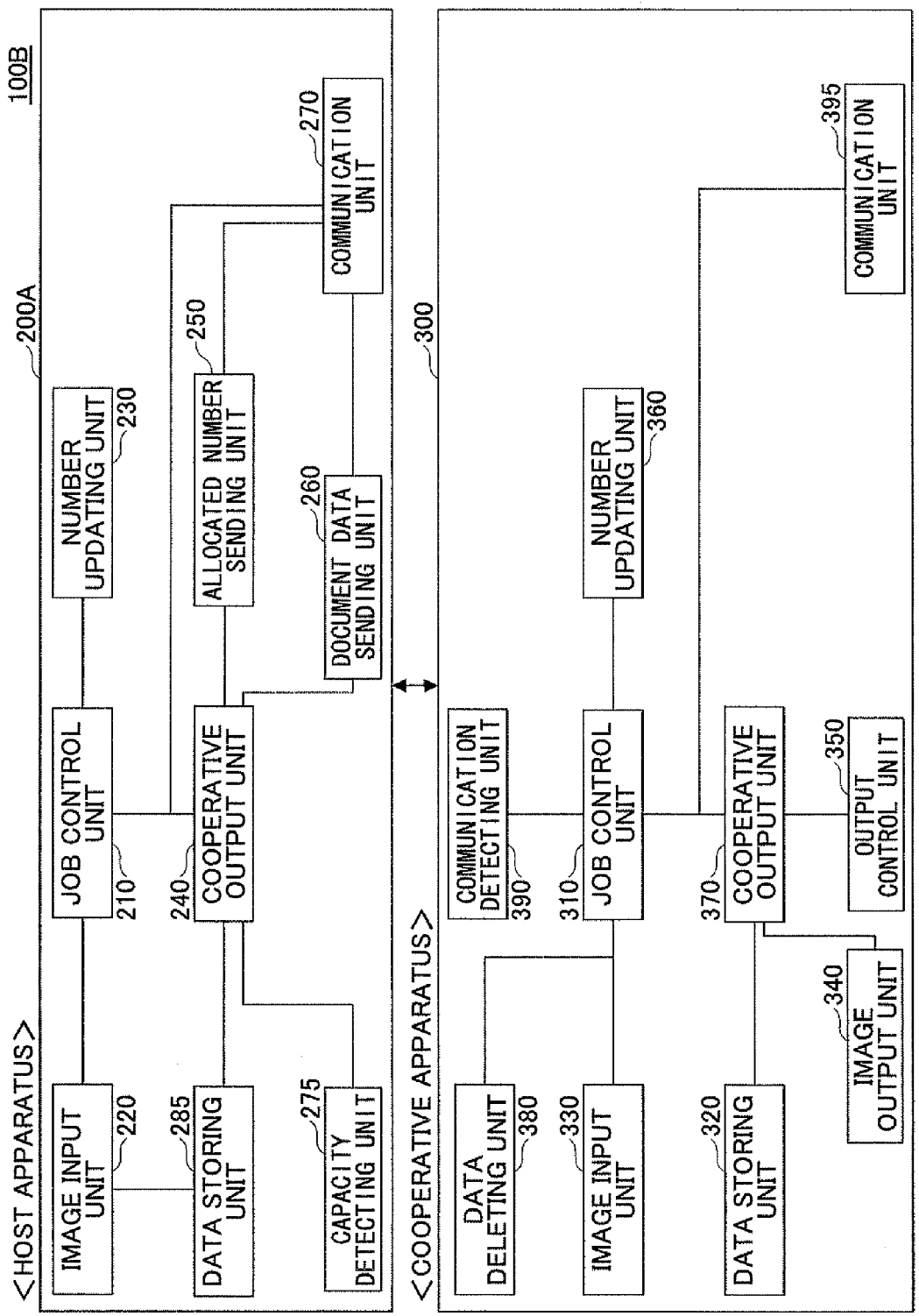
FIG. 8 is a block diagram showing functions of the host apparatus and the cooperative apparatus of another embodiment.

FIG. 8 is a block diagram showing a host apparatus 200A and the cooperative apparatus 300 of an image processing system 100B of the third embodiment.

The image processing system 100B of this embodiment is composed of the host apparatus 200A and the cooperative apparatus 300 connected with each other via a network or the like.

The host apparatus 200A of this embodiment further includes a capacity detecting unit 275 in addition to the elements of the host apparatus 200 explained in the first embodiment.

The capacity detecting unit 275 accesses the cooperative apparatus 300 and determines whether the cooperative apparatus 300 has available capacity of the permanent storage area enough for storing the document data or not.

The permanent storage area of the cooperative apparatus 300 may be a predetermined area of the HDD 34 allocated for storing document data sent from the host apparatus 200A.

Figure 9:
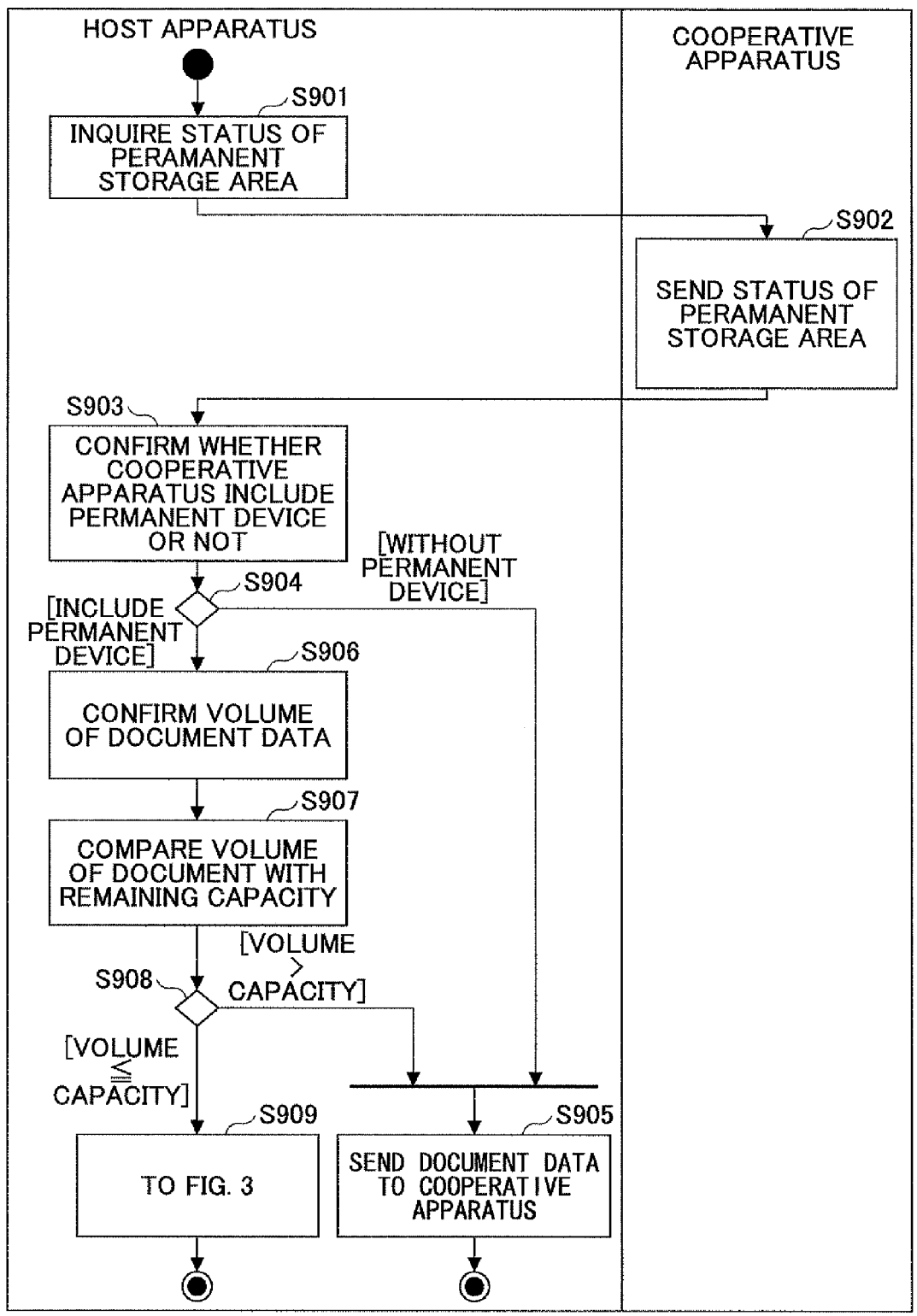
FIG. 9 is a flowchart showing the operations of the image processing system of the embodiment.

The operation of the image processing system 100B of this embodiment will be explained with reference to FIG. 9. FIG. 9 is a flowchart showing the operation of the image processing system 100B of the third embodiment.

In the host apparatus 200A of this embodiment, the capacity detecting unit 275 queries the cooperative apparatus 300 whether it is possible to permanently store the document data when the cooperative output operation is to be performed in the image processing system 100B (step S901). Upon receiving the query, the cooperative apparatus 300 sends the status of its permanent storage area to the host apparatus 200A (step S902).

The status of its permanent storage area may be, for example, information indicating whether the cooperative apparatus 300 includes such a permanent storage area or not, information indicating the remaining capacity of the permanent storage area, or the like. FIGS. 10A and 10B are tables showing examples of the status of the permanent storage area. FIG. 10A shows a status of the permanent storage area 11 where the cooperative apparatus 300 includes a device such as the HDD 34 (hereinafter simply referred to as a permanent device) for the permanent storage area. The status of the permanent storage area 11 includes the information indicating the remaining capacity of the permanent device. FIG. 10B shows a status of the permanent storage area 12 where the cooperative apparatus 300 does not include a permanent device.

Referring back to FIG. 9, the capacity detecting unit 275 of the host apparatus 200A confirms whether the cooperative apparatus 300 includes a permanent device based on the status of permanent storage area sent from the cooperative apparatus 300 (step S903). When the cooperative apparatus 300 does not include the permanent device (step S904), the host device 200A sends the document data with an operation where the number of times of outputting the document data is controlled by the host apparatus 200A (step S905). In this case, the document data is not permanently stored in the cooperative apparatus 300.

When the cooperative apparatus 300 includes a permanent device in step S904, the capacity detecting unit 275 confirms the volume of the document data to be output by the cooperative apparatus 300 (step S906). Subsequently, the capacity detecting unit 275 compares the volume of the document data and the remaining capacity of the permanent device (step S907).

When the volume of the document data is larger than the remaining capacity of the permanent device of the cooperative apparatus 300 (step S908), the operation of the host apparatus 200A goes to step S905. When the volume of the document data is equal to or less than the remaining capacity of the permanent device the cooperative apparatus 300, the operation of the host apparatus 200A goes to step S301 shown in FIG. 3 (step S909).

As described above, according to the present embodiment, whether the document data can be permanently stored in the cooperative apparatus 300 or not is determined before the cooperative output operation is performed, and therefore, failure of output because of the shortage of the available capacity of the permanent storage area in the cooperative apparatus can be prevented.

Fourth Embodiment

The fourth embodiment will be explained in the following. In the fourth embodiment, the properties or the bibliographical information of the document data is also sent to the cooperative apparatus when the document data is sent to the cooperative apparatus from the host apparatus. In the following description, only the operations different from those of the first embodiment to the third embodiment will be explained and explanations of the same operations are not repeated.

Figure 11:
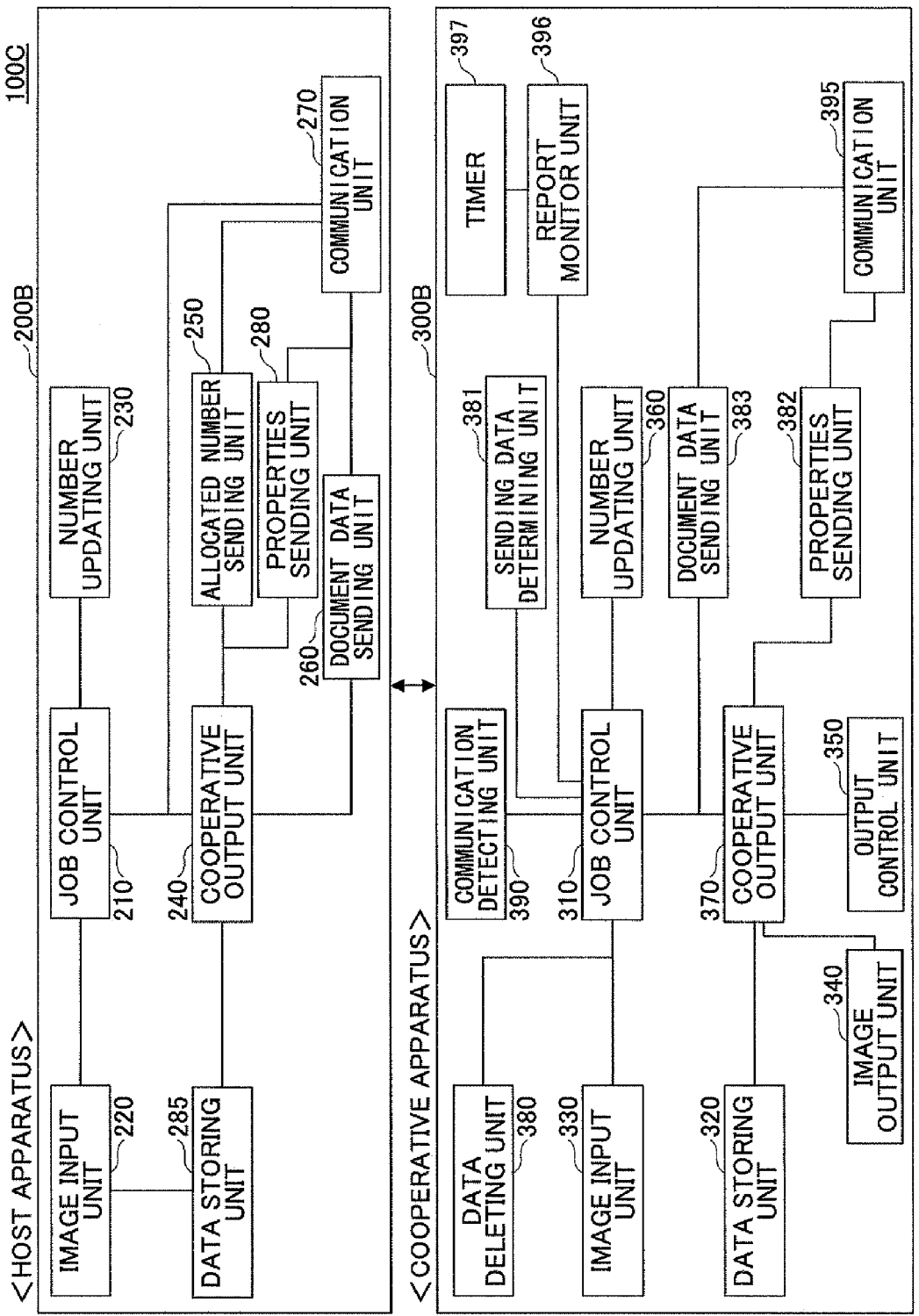
FIG. 11 is a block diagram showing functions of the host apparatus and the cooperative apparatus of another embodiment.

FIG. 11 is a block diagram showing functions of the host apparatus and the cooperative apparatus composing the image processing system of the fourth embodiment.

In an image processing system 100C of this embodiment, a host apparatus 200B and a cooperative apparatus 300B are connected via the network or the like.

The host apparatus 200B of this embodiment further includes a properties sending unit 280 in addition to the components included in the host apparatus 200 as explained in the first embodiment. The properties sending unit 280 sends properties or the bibliographical information (hereinafter simply referred to as properties) of the document data to be output to the cooperative apparatus 300B. The contents of the properties of the document data will be explained in detail later.

The cooperative apparatus 300B of this embodiment further includes a sending data determining unit 381, a properties sending unit 382, and a document data sending unit 383 in addition to the units included in the cooperative apparatus 300A as explained in the second embodiment.

The sending data determining unit 381 determines whether to send the properties of the document data to be output from the cooperative apparatus 300B to the host apparatus 200B or not. The properties sending unit 382 sends the properties of the document data to the host apparatus 200B. The document data sending unit 383 sends the document data to the host apparatus 200B.

Figure 12:
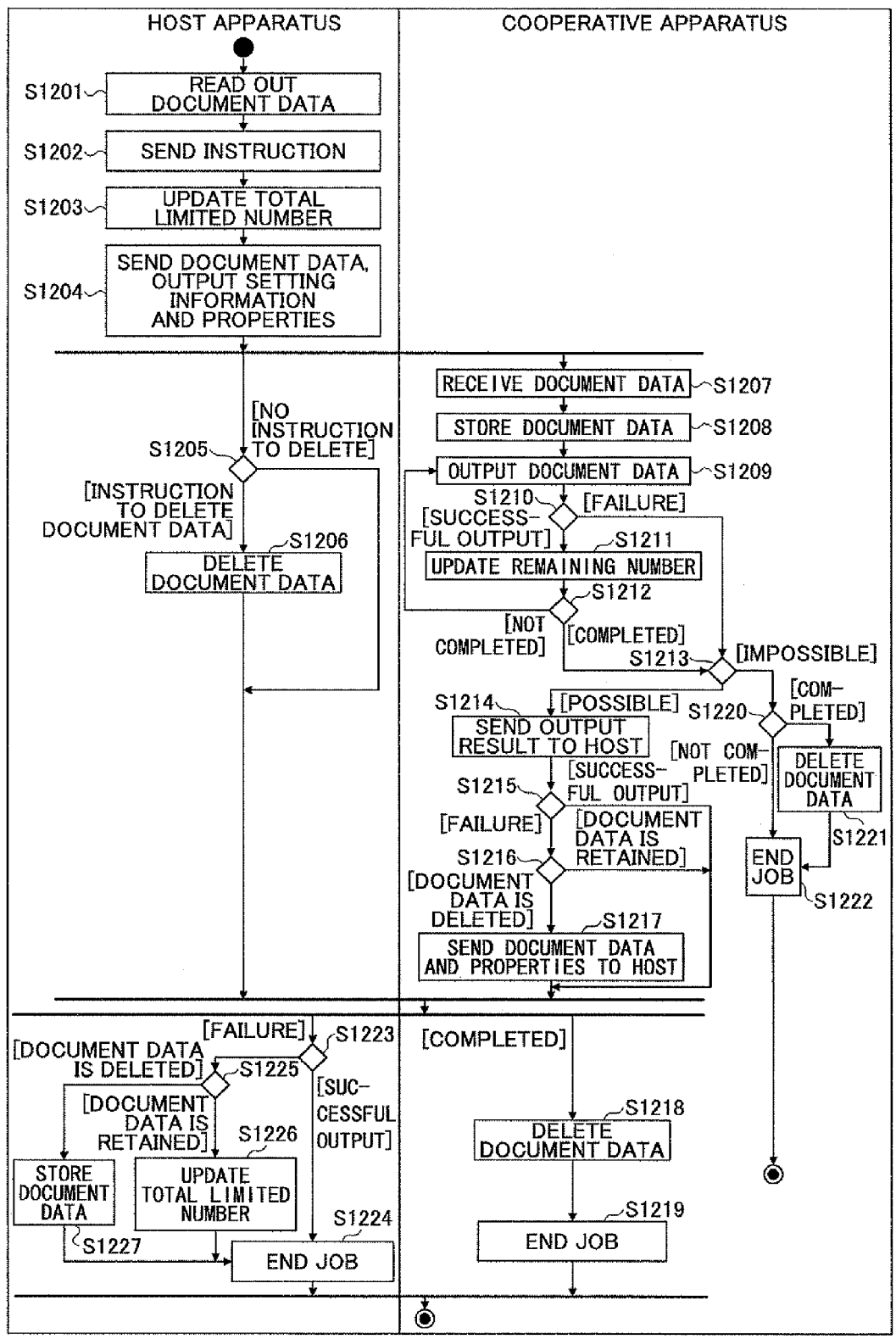
FIG. 12 is a flowchart showing the operations of the image processing system of the embodiment.

The operation of the image processing system 100C of this embodiment will be explained with reference to FIG. 12. FIG. 12 is a flowchart showing the operations of the image processing system 100C of the fourth embodiment.

Operations of step S1201 to S1203 shown in FIG. 12 are same as those of step S301 to step S303 shown in FIG. 3 explained with reference to FIG. 3, respectively, and therefore, explanations are not repeated.

Subsequent to step S1203, the host apparatus 200B sends the document data, the output setting information 41, and the properties of the document data by the document data sending unit 260, the allocated number sending unit 250, and the properties sending unit 280, respectively (step S1204).

After sending the document data, the output setting information 41, and the properties of the document to the cooperative apparatus 300B, the host apparatus 200B determines whether the instruction to delete the document data is input (step S1205). When such an instruction is input, the host apparatus 200B deletes the document data (step S1206). For example, when the total limited number of output times for the document data becomes zero by sending the document data to the cooperative apparatus 300B with the allocated number of output times allocated for the cooperative apparatus 300B, the user may input an instruction to delete the document from the host apparatus 100C.

FIG. 13 is a table showing an example of the properties. The properties of the embodiment may be the bibliographical information of the document data. The properties 50 shown in FIG. 13 includes the name of the document data, the user ID of the user who made the document data, the user name, the user name shown on the panel, the document origination date, the last updated date of the document, the password of the document, and the information whether a password is set to the document. The properties 50 may include any other items in addition to those shown in FIG. 13. Alternatively, the properties 50 may not include all of the items shown in FIG. 13. The items included in the properties 50 may be set by the system administrator or the like of the image processing system 100C, for example.

Referring back to FIG. 12, operations of step S1207 to step 1214 shown in FIG. 12 are same as those of step S305 to step S312 shown in FIG. 3 explained with reference to FIG. 3, respectively, and therefore, explanations are not repeated.

After step S1214, the cooperative apparatus 300B of the image processing system 100C determines whether the output result 42 includes a content that indicates output failure of the document data (step S1215). When the output result 42 does not include the content that indicates output failure of the document data, the process proceeds to step S1218, which will be explained later.

When the output result 42 includes the content that indicates output failure of the document data in step S1215, the cooperative apparatus 300B accesses the host apparatus 200B to determine whether the document data to be output is stored or retained in the host apparatus 200B (step S1216). At this time, whether the document data to be output is stored or retained in the host apparatus 200B may be determined by referring to information stored as the item "DOCUMENT DATA" of a table as shown in FIGS. 23A to 23C. When the document data is retained in step S1216, the process proceeds to step S1218. When the document data is not retained in step S1216, the cooperative apparatus 300B sends the document data and its properties to the host apparatus 200B (step S1217).

Subsequently, after sending the output result 42 to the host apparatus 200B, the cooperative apparatus 300B deletes the document data and its properties stored in the (step S1218), and ends the job (step S1219).

Operations of step S1220 to step S1222 shown in FIG. 12 are same are those of step S315 to step S317 shown in FIG. 3 explained with reference to FIG. 3, and therefore, explanations are not repeated.

Upon receiving the output result 42 from the cooperative apparatus 300B, the host apparatus 200B determines whether the output result 42 includes content that indicates output failure of the document data (step S1223). When the output result 42 does not include the content that indicates output failure of the document data in step S1223, the job control unit 210 ends the job (step S1224).

When the output result 42 includes the content that indicates output failure by the cooperative apparatus 300B of the document data in step S1223, the host apparatus 200B determines whether the document data previously stored in the data storing unit 285 is deleted (step S1225).

When the document data is not deleted in step S1225, the number updating unit 230 of the host apparatus 200B adds the number of times that are not actually output by the cooperative apparatus 300B to the total limited number of output times set for the document data (step S1226). Then, the operation of the host apparatus 200B proceeds to step S1224. When the document data is deleted in step S1225, the host apparatus 200B stores the document data and its properties received from the cooperative apparatus 300B in the data storing unit 285 (step S1227) and proceeds to step S1224. In step S1227, the total limited number of output times for the document data may be newly set where the total limited number becomes the output times ended in failure in the cooperative apparatus 300B.

Figure 14:
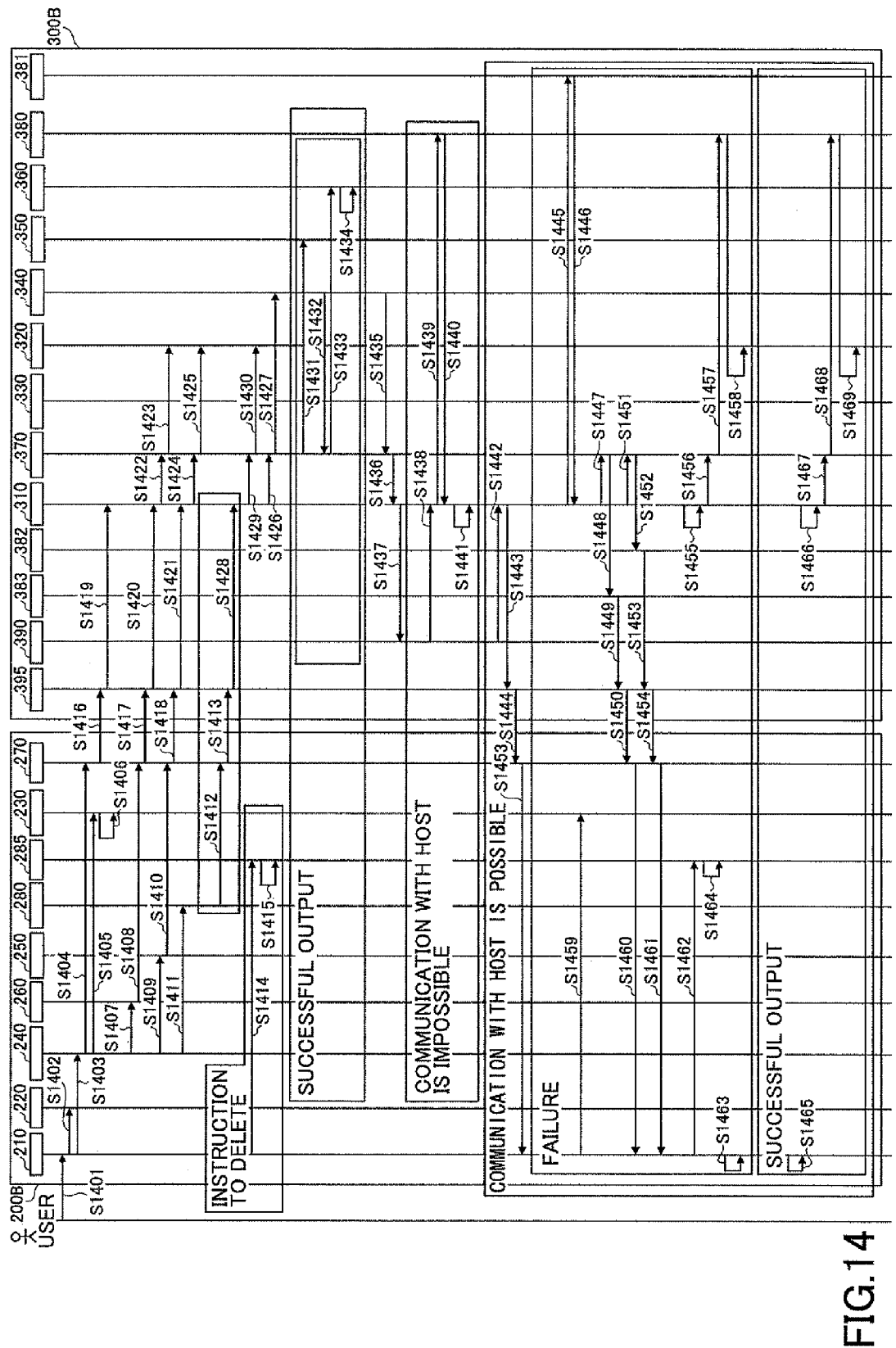
FIG. 14 is a sequence diagram showing the operations of the image processing system of the embodiment.

The operation of the image processing system 100C of this embodiment will be further explained with reference to FIG. 14. FIG. 14 is a sequence diagram showing the operation of the image processing system 100C of the fourth embodiment.

In FIG. 14, operations of step S1401 to step S1410 are same as those of step S501 to step S510 shown in FIG. 5, respectively. Similarly, operations of step S1416 to step S1427 shown in FIG. 14 are same as those of step S511 to step S522 shown in FIG. 5, respectively. Similarly, operations of step S1431 to step S1444 shown in FIG. 14 are same as those of step S523 to step S536 shown in FIG. 5, respectively. Similarly, operation of step S1453 shown in FIG. 14 is same as that of step S541 shown in FIG. 5. Similarly, operations of step S1455 to step S1458 shown in FIG. 14 are same as those of step S537 to step S540 shown in FIG. 5, respectively. Similarly, operations of step S1465 to step S1469 shown in FIG. 14 are same as those of step S544 to step S548 shown in FIG. 5, respectively. Therefore, explanations to those same steps as shown in FIG. 5 are not repeated.

Subsequent to step S1410, the cooperative output unit 240 of the host apparatus 200B instructs the properties sending unit 280 to send the properties of the document data corresponding to the document data (step S1411). Upon receiving the instruction, the properties sending unit 280 passes the properties of the document data to the communication unit 270 (step S1412). The communication unit 270 sends the properties to the cooperative apparatus 300B (step S1413).

Further, in the host apparatus 200B, when the job control unit 210 receives the instruction to delete the document data, the job control unit 210 deletes the document data stored in the data storing unit 285 (step S1414). The document data stored in the data storing unit 285 is deleted (step S1415).

Upon receiving the properties of the document data, the communication unit 395 of the cooperative apparatus 300B passes it to the job control unit 310 (step S1428). The job control unit 310 instructs the cooperative output unit 370 to store the properties of the document data (step S1429). Upon receiving the instruction, the cooperative output unit 370 stores the properties of the document data in the data storing unit 320. In this embodiment, the document data and its properties correspond with each other in the data storing unit 320.

The job control unit 310 of the cooperative apparatus 300B instructs the sending data determining unit 381 to determine whether to send the document data and its properties to the host apparatus 200B (step S1445). The sending data determining unit 381 reports whether to send the document data and its properties to the host apparatus 200B to the job control unit 310 (step S1446). In this embodiment, the sending data determining unit 381 determines to send the document data and its properties to the host apparatus 200B when the output failure occurs in the cooperative apparatus 300B, based on the output result 42, in addition to the fact that the document data is deleted in the host apparatus 200B.

Upon receiving the report to send the document data and its properties to the host apparatus 200B in step S1446, the job control unit 310 instructs the cooperative output unit 370 to send the document data (step S1447). Upon receiving this instruction, the cooperative output unit 370 instructs the document data sending unit 383 to send the document data (step S1448). The document data sending unit 383 passes the document data to the communication unit 395 (step S1449). The communication unit 395 sends the document data to the host apparatus 200B (step S1450).

Further, the job control unit 310 instructs the cooperative output unit 370 to send the properties of the document data (step S1451). Upon receiving the instruction, the cooperative output unit 370 instructs the properties sending unit 382 to send the properties of the document data (step S1452). The properties sending unit 382 passes the properties of the document data to the communication unit 395 (step S1453). The communication unit 395 sends the properties of the document data to the host apparatus 200B (step S1454).

In the host apparatus 200B, the communication unit 270 passes the document data to the job control unit 210 upon receiving it from the cooperative apparatus 300B (step S1460). The communication unit 270 passes the properties of the document data to the job control unit 210 upon receiving it from the cooperative apparatus 300B (step S1461). The job control unit 210 recovers the document data and its properties to store them in the data storing unit 285 (step S1462, step S1464). At this time, the total limited number of output times for the document is also set. Then, the job control unit 210 ends the job (step S1463).

As described above, according to the present embodiment, when the output at the cooperative apparatus 300B is ended in failure, and the document data to be output is deleted in the host apparatus 200B, the host apparatus 200B receives the document data and its properties in addition to the output result from the cooperative apparatus 300B. Therefore, as the host apparatus 200B can recover the document data and its properties to be stored in the data storing unit 285, the host apparatus 200B can re-output the document data for the case when output of the document data at the cooperative apparatus 300B ended in failure and the total limited number of output times is increased in the host apparatus 200B.

Fifth Embodiment

The fifth embodiment will be explained. In the fifth embodiment, only the operation for the case when the cooperative apparatus cannot communicate with the host apparatus, the cooperative apparatus can try outputting the document data again is different from the operations of the second embodiment. Therefore, only the operations different from those of the second embodiment will be explained and explanations of the same operations are not repeated.

Figure 15:
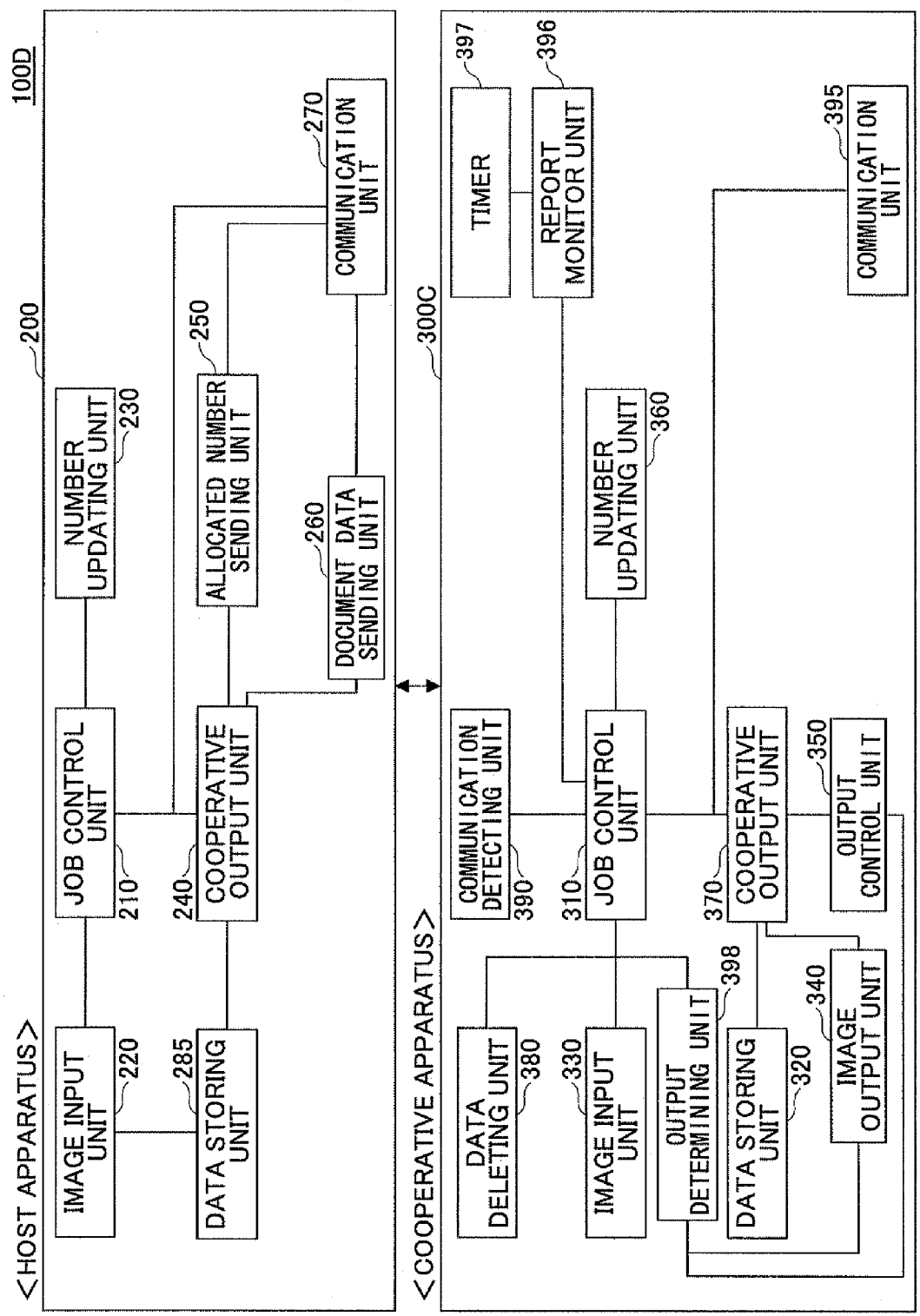
FIG. 15 is a block diagram showing functions of the host apparatus and the cooperative apparatus of another embodiment.

FIG. 15 is a block diagram showing the structure of the image processing system including the host apparatus and the cooperative apparatus according to the fifth embodiment.

The image processing system 100D of this embodiment is composed of the host apparatus 200 and a cooperative apparatus 300C connected with each other via the network or the like.

The cooperative apparatus 300C of this embodiment further includes an output determining unit 398 in addition to the components included in the cooperative apparatus 300A of the second embodiment.

In this embodiment, the same as the above explained embodiments, the image output unit 340 outputs the document data in accordance with an initial instruction to output the document data by the host apparatus 100D under a cooperative output operation. In addition, the image output unit 340 outputs the document data stored in the data storing unit 320, the output of which by the initial instruction is once ended in failure in accordance with an additional instruction to output the document data. Hereinafter, the output by the additional instruction will be referred to as "normal output"

or "normally output". Here, normal output means that the cooperative apparatus 300C outputs the document data without the cooperate operation with the host apparatus 200.

The output determining unit 398 determines whether to normally output the document data.

Figure 16:
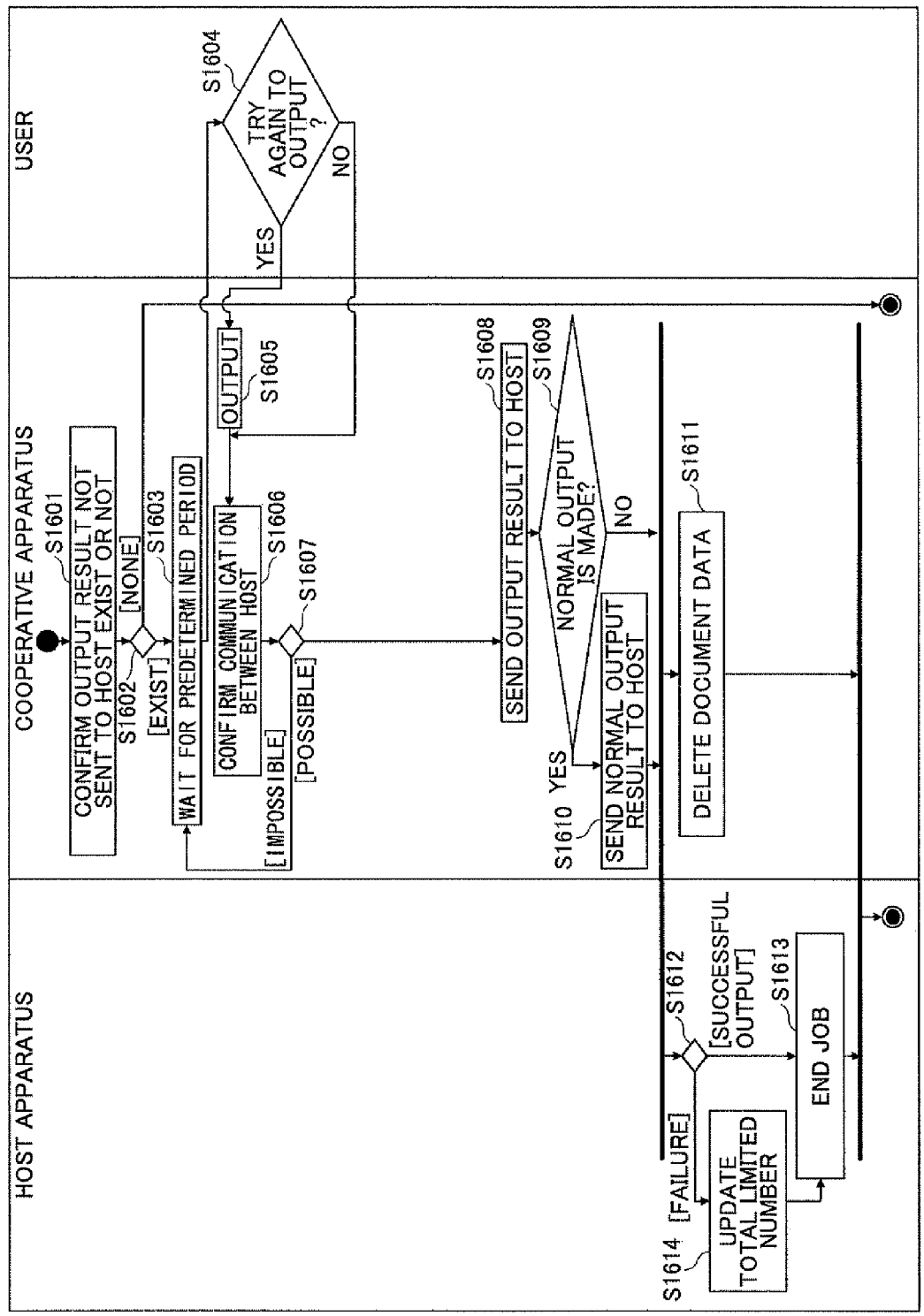
FIG. 16 is a flowchart showing the operations of the image processing system of the embodiment.

The operation of the image processing system 100D of this embodiment will be explained with reference to FIG. 16. FIG. 16 is a flowchart showing the operations of the image processing system 100D of the fifth embodiment.

In the image processing system 100D of this embodiment, the report monitor unit 396 of the cooperative apparatus 300C determines whether there is any output result that is not sent yet to the host apparatus 200 (step S1601). When there exists any output result that is not sent yet to the host apparatus 200 (step S1602), the cooperative apparatus 300C waits for the predetermined period set to the timer 397 (step S1603). When there is no output result that is not sent yet to the host apparatus 200 in step S1602, the cooperative apparatus 300D ends the job.

The cooperative apparatus 300D determines whether the job once ended in failure is ordered by an additional instruction to be performed again within the predetermined period (step S1604). The instruction may be input by the user via the operations unit 36 of the cooperative apparatus 300D.

When the instruction to output the document data again is made (YES of step S1604), the output determining unit 398 outputs the document data to be output (step S1605), and the process goes to step S1606. When the document data is output in step S1605, the fact may be recorded in the output result. When the instruction to output the document data again is not made in step S1604 (NO of step S1604), the process goes to step S1606.

The communication detecting unit 390 of the cooperative apparatus 300C confirms whether the communication with the host apparatus 200 is possible (step S1606). When the communication with the host apparatus 200 is possible in step S1606 (step S1607), the communication unit 395 sends the output result to the host apparatus 200 (step S1608). When the communication with the host apparatus 200 is impossible in step S1606, the process goes back to step S1603.

When sending the output result to the host apparatus 200, the cooperative apparatus 300C confirms whether the normal output that is output by the instruction of the uses is made (step S1609). When it is confirmed that the normal output is made in step S1609, the communication unit 395 of the cooperative apparatus 300C reports the host apparatus 200 the output result of the normal output (step S1610). Subsequently, the data storing unit 320 deletes the document data (step S1611). When it is confirmed that the normal output is not made in step S1609, the process goes to step S1611.

The output results sent in step S1608 and in step S1610 may be sent together with each other to the host apparatus 200.

Upon receiving the output results of the cooperative output operation and the normal output operation, the host apparatus 200 determines whether the document data is output by the cooperative apparatus 300C for the allocated number of output times without any failure (step S1612). When it is determined that the document data is successfully output by the cooperative apparatus 300C for the allocated number of output times in step S1612, the job control unit 210 ends the job (step S1613).

When, on the other hand, it is determined that the document data is not actually output by the cooperative apparatus 300C for the allocated number of output times, due to the failure or the like, for example, in step S1612, the number updating unit 230 adds the number of times that are not actually output by the cooperative apparatus 300C, among the allocated number of output times allocated to the cooperative apparatus 300C, to the total limited number of output times set for the document data (step S1614). Then, the job control unit 210 ends the job (step S1613).

Figure 17:
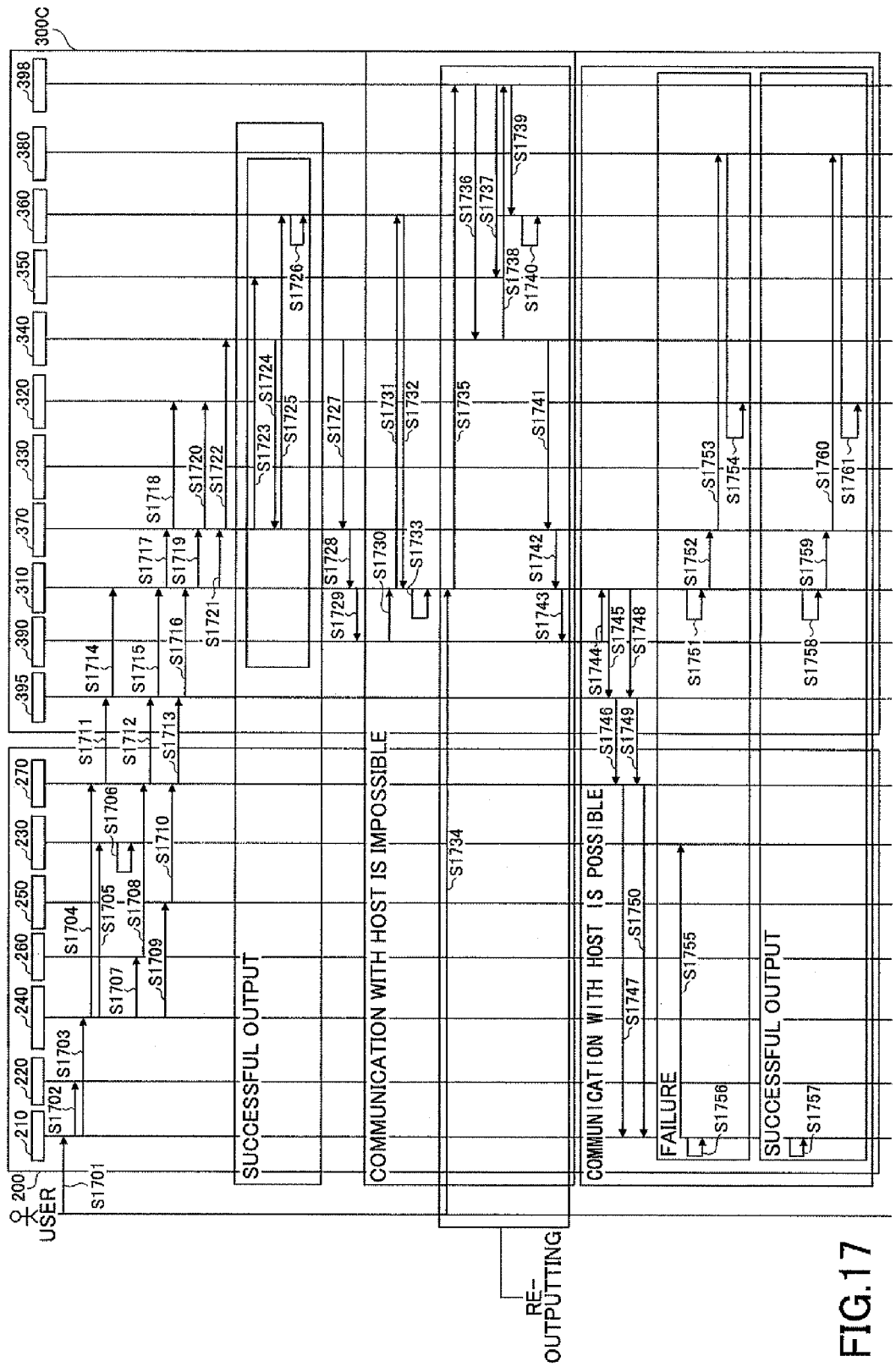
FIG. 17 is a sequence diagram showing the operations of the image processing system of the embodiment.

The operation of the image processing system 100D of this embodiment will be further explained with reference to FIG. 17. FIG. 17 is a sequence diagram showing the operation of the image processing system 100D of the fifth embodiment.

In FIG. 17, operations of step S1701 to step S1733 are same as those of step S501 to step S533 shown in FIG. 5, respectively. Similarly, operations of step S1744 to step S1746 shown in FIG. 17 are same as those of step S534 to step S536 shown in FIG. 5, respectively. Similarly, operations of step S1751 to step S1761 are same as those of step S537 to step S540 and step S542 to step S548 shown in FIG. 5, respectively. Therefore, explanations for those steps the same as shown in FIG. 5 are not repeated.

In the cooperative apparatus 300C, when the job control unit 310 receives an instruction to output the document data the output for which has once ended in failure (step S1734), the job control unit 310 instructs the output determining unit 398 to normally output the document data (step S1735). Upon receiving the instruction, the output determining unit 398 instructs the image output unit 340 to output the document data (step S1736). At the same time, the output determining unit 398 confirms with the output control unit 350 the number of output times (step S1737).

Subsequently, the image output unit 340 reports the output determining unit 398 the completion of output operations every time the document data is output (step S1738). Upon receiving the report, the output determining unit 398 instructs the number updating unit 360 to update the number of output times included in the output setting information (step S1739). Upon receiving the instruction, the number updating unit 360 decreases the number of output times (step S1740).

After that, the image output unit 340 passes the output result to the cooperative output unit 370 (step S1741). The cooperative output unit 370 passes the output result to the communication unit 395 (step S1742). The communication unit 395 sends this output result to the host apparatus 200 (step S1743).

The communication unit 270 of the host apparatus 200 passes the received output result to the job control unit 210 (step S1747). Subsequently, the job control unit 310 of the cooperative apparatus 300C passes the output result of the normal output (hereinafter referred to as second output result) to the communication unit 395 (step S1748). The communication unit 395 sends the second output result to the host apparatus 200 (step S1749). In the host apparatus 200, the communication unit 270 passes the received second output result to the job control unit 210 (step S1750).

As described above, in this embodiment, the cooperative apparatus 300D can independently output the document data when the output of the document data is once ended in failure and the communication with the host apparatus 200 is impossible. Further, as such an output result (second output result) is also sent to the host apparatus 200, the host apparatus 200 can update the total limited number of output times set for the document data. Therefore, the total limited number of output times can be properly controlled.

Sixth Embodiment

The sixth embodiment will be explained. In the sixth embodiment, only the operation where the output result is not sent to the host apparatus while the operations unit of the cooperative apparatus is operated, is different from the operations of the fifth embodiment. Therefore, only the operations different from those of the fifth embodiment will be explained and explanations of the same operations are not repeated.

Figure 18:
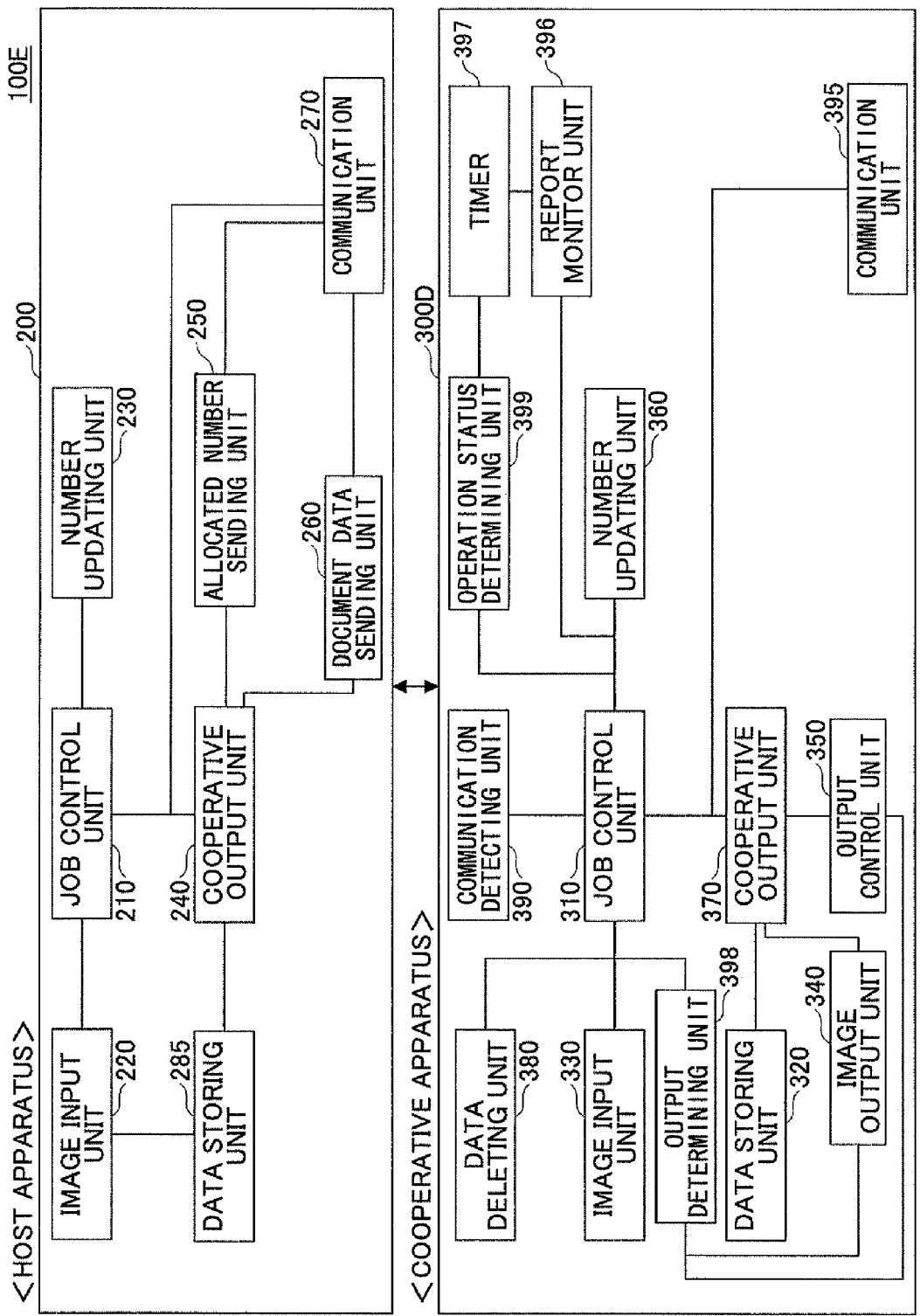
FIG. 18 is a block diagram showing functions of the host apparatus and the cooperative apparatus of another embodiment.

FIG. 18 is a block diagram showing functions of the host apparatus and the cooperative apparatus composing the image processing system of the sixth embodiment.

In an image processing system 100E of this embodiment, the host apparatus 200 and a cooperative apparatus 300D are connected via the network or the like.

The cooperative apparatus 300D of this embodiment further includes an operation status determining unit 399 in addition to the components included in the cooperative apparatus 300C of the fifth embodiment.

The operation status determining unit 399 determines whether the cooperative apparatus 300D is normally outputting the document data output of which has once ended in failure or not. In this embodiment, even if the communication with the host apparatus 200 becomes possible while the output data is normally output, the report of output result to the host apparatus 200 is not performed until the normal output of the document data ends.

Figure 19:
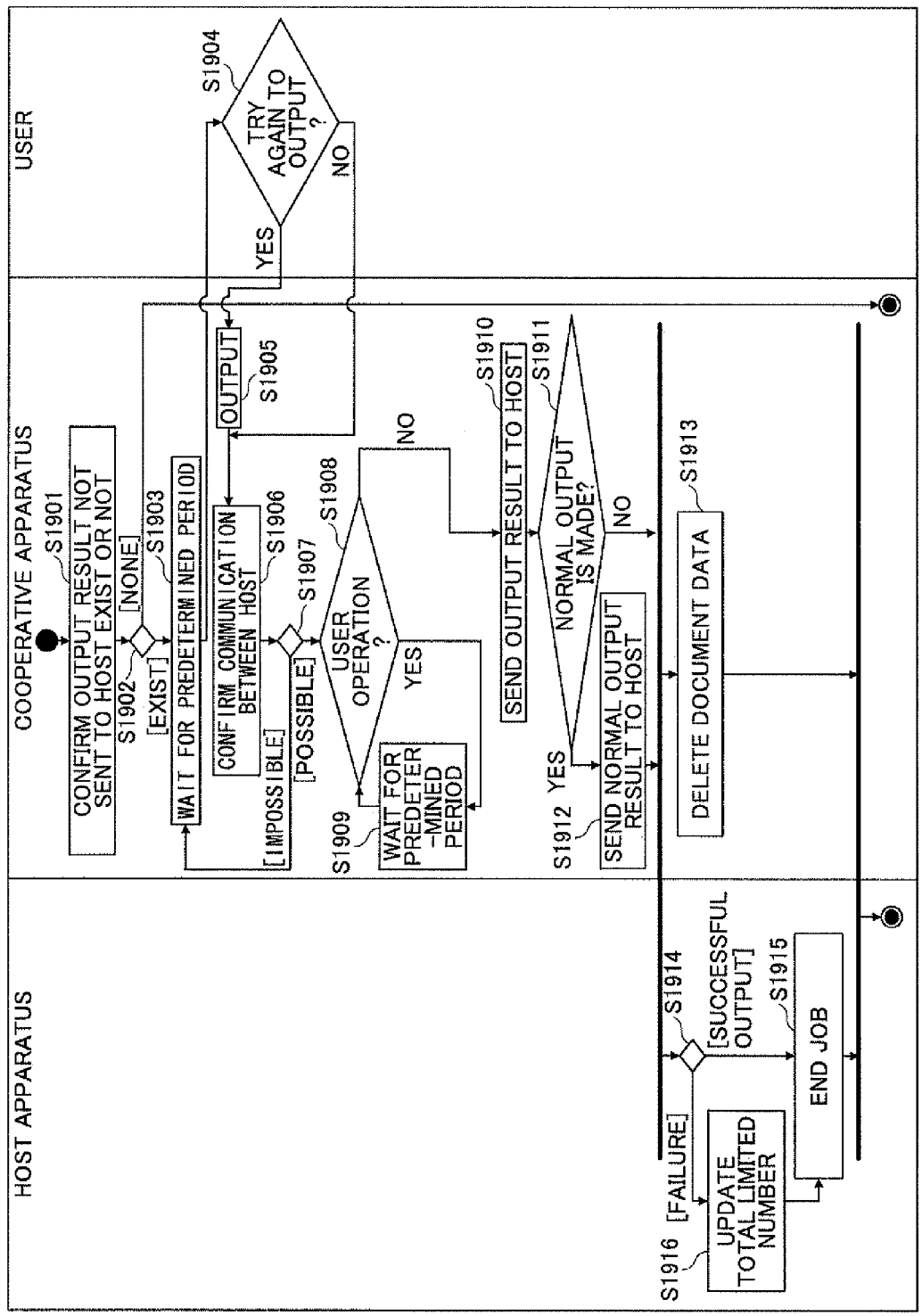
FIG. 19 is a flowchart showing the operations of the image processing system of the embodiment.

The operations of the image processing system 100E of this embodiment will be explained with reference to FIG. 19. FIG. 19 is a flowchart showing the operation of the image processing system 100E of the sixth embodiment.

Operations of step S1901 to step S1907 in FIG. 19 are same as those of step S1601 to step S1607 in FIG. 16, and therefore, explanations of which are not repeated.

When the communication with the host apparatus 200 becomes possible in step S1907, the operation status determining unit 399 of the cooperative apparatus 300D determines whether the operation of outputting the document data, the output of which has once ended in failure by the operations unit 36 (user operation) is performed (step S1908).

When the operation by the operations unit 36 is performed in step S1908, the cooperative apparatus 300D waits for a predetermined period without sending the output result to the host apparatus 200 (step S1909). The predetermined period may be set previously in the cooperative apparatus 300D. When the operation by the operations unit 36 is performed in step S1908, the process goes to step S1910.

Operations of step S1910 to step S1916 in FIG. 19 are same as those of step S1608 to step S1614 in FIG. 16, and therefore, explanations of which are not repeated.

Figure 20:
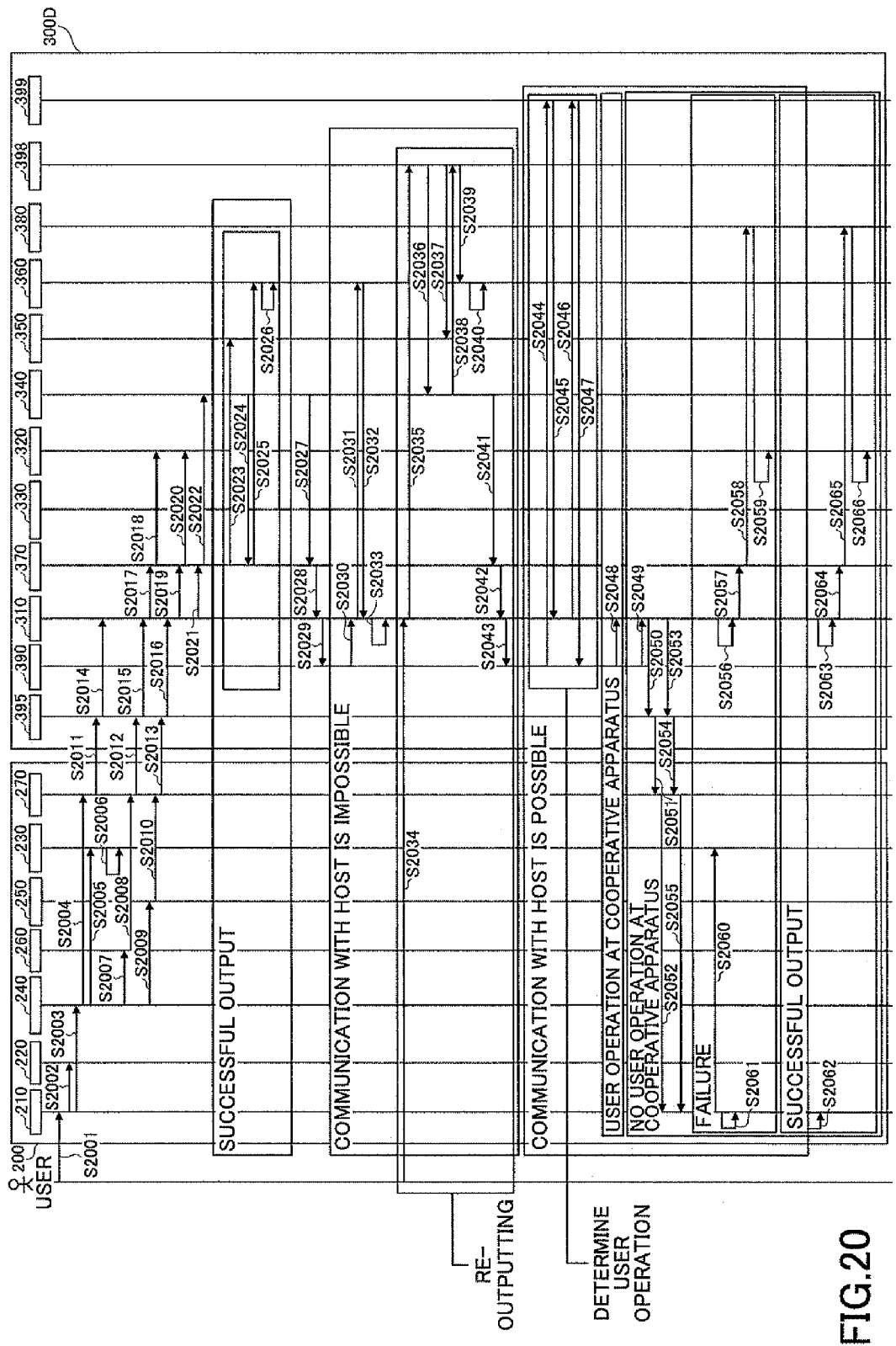
FIG. 20 is a sequence diagram showing the operations of the image processing system of the embodiment.

The operation of the image processing system 100E of this embodiment will be further explained with reference to FIG. 20. FIG. 20 is a sequence diagram showing the operation of the image processing system 100E of the sixth embodiment.

In FIG. 20, operations of step S2001 to step S2043 are same as those of step S1701 to step S1733 shown in FIG. 17. Similarly, operations of step S2049 to step S2066 are same as those of step S1744 to step S1761 shown in FIG. 17. Therefore, explanations of those the same as shown in FIG. 17 are not repeated.

When the output of the document data has ended in failure in the cooperative apparatus 300D and the communication detecting unit 390 detects that the communication with the host apparatus 200 is possible, the output determining unit 398 instructs the operation status determining unit 399 to determine the operation of the operations unit 36 (step S2044). Upon receiving the instruction, the operation status determining unit 399 queries the job control unit 310 about the status of the output operation (step S2045). Upon receiving the query, the job control unit 310 reports the operation status determining unit 399, if the normal output of the document data is performed, of the fact that the normal output is being performed (step S2046). Upon receiving the report, the operation status determining unit 399 reports the communication detecting unit 390 not to make communication with the host apparatus 200 (step S2047). Upon receiving the report, the output determining unit 398 reports the job control unit 310 not to make communication with the host apparatus 200 (step S2048).

As described above, in this embodiment, the cooperative apparatus 300D does not send the output result while the normal output operation of outputting the document data is performed. According to this embodiment, the cooperative apparatus 300D can prevent deleting the document data by preventing sending the output result even when the communication with the host apparatus 200 becomes possible if the normal operation of outputting the document data again is performed at that time. Therefore, the case where the normal output of the document data becomes impossible because the document data is deleted while the normal output of the document data is performed can be prevented.

Seventh Embodiment

The seventh embodiment will be explained. In the seventh embodiment, only the operation where the output result is not sent to the host apparatus while the operation on the document data to be output is performed in the host apparatus after the normal output of the document data in the cooperative apparatus, is different from the operations of the fifth embodiment. Therefore, only the operations different from those of the fifth embodiment will be explained and explanations of the same operations are not repeated.

Figure 21:
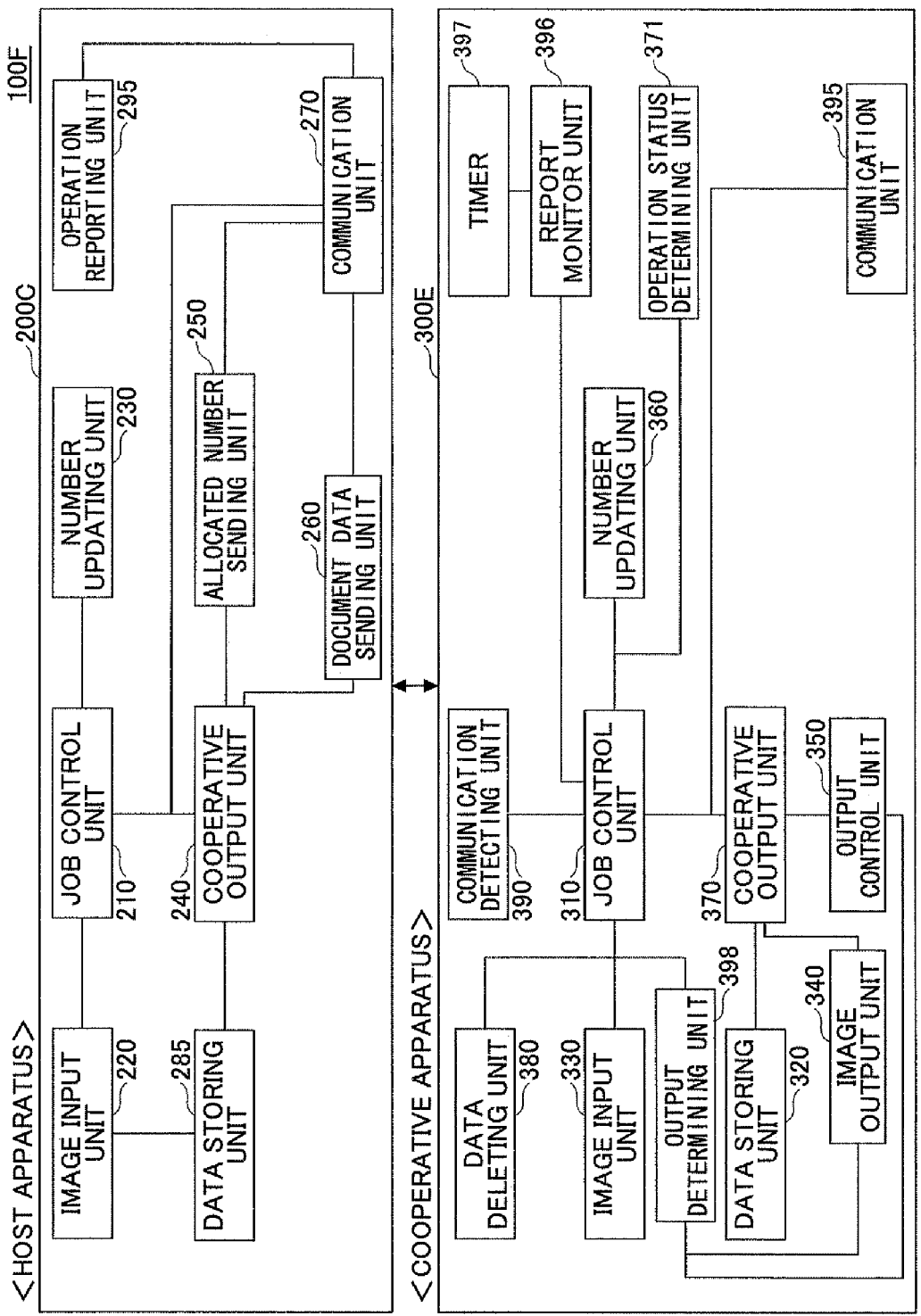
FIG. 21 is a block diagram showing functions of the host apparatus and the cooperative apparatus of another embodiment.

FIG. 21 is a block diagram showing functions of the host apparatus and the cooperative apparatus composing the image processing system of the seventh embodiment.

An image processing system 100F of this embodiment, a host apparatus 200C and a cooperative apparatus 300E are connected via the network or the like.

The host apparatus 200C of this embodiment further includes an operation reporting unit 295 in addition to the components included in the host apparatus 200 of the first embodiment shown in FIG. 2.

The operation reporting unit 295 reports the cooperative apparatus 300E that the operation on the document data to be output under the cooperative output is performed by the host apparatus 200C. The operation reporting unit 295 of this embodiment determined that the operation on the document data to be output under the cooperative output is being performed when the list of the document data stored in the host apparatus 200 is displayed or the document data to be output is selected by the operation of the uses via the operations unit 26, for example.

The cooperative apparatus 300E of this embodiment further includes an operation status determining unit 371 instead of the operation status determining unit 399 of the cooperative apparatus 300C of the sixth embodiment shown in FIG. 18.

The operation status determining unit 371 determines whether to send the output result to the host apparatus 200C based on the operation report sent from the host apparatus 200C.

Figure 22:
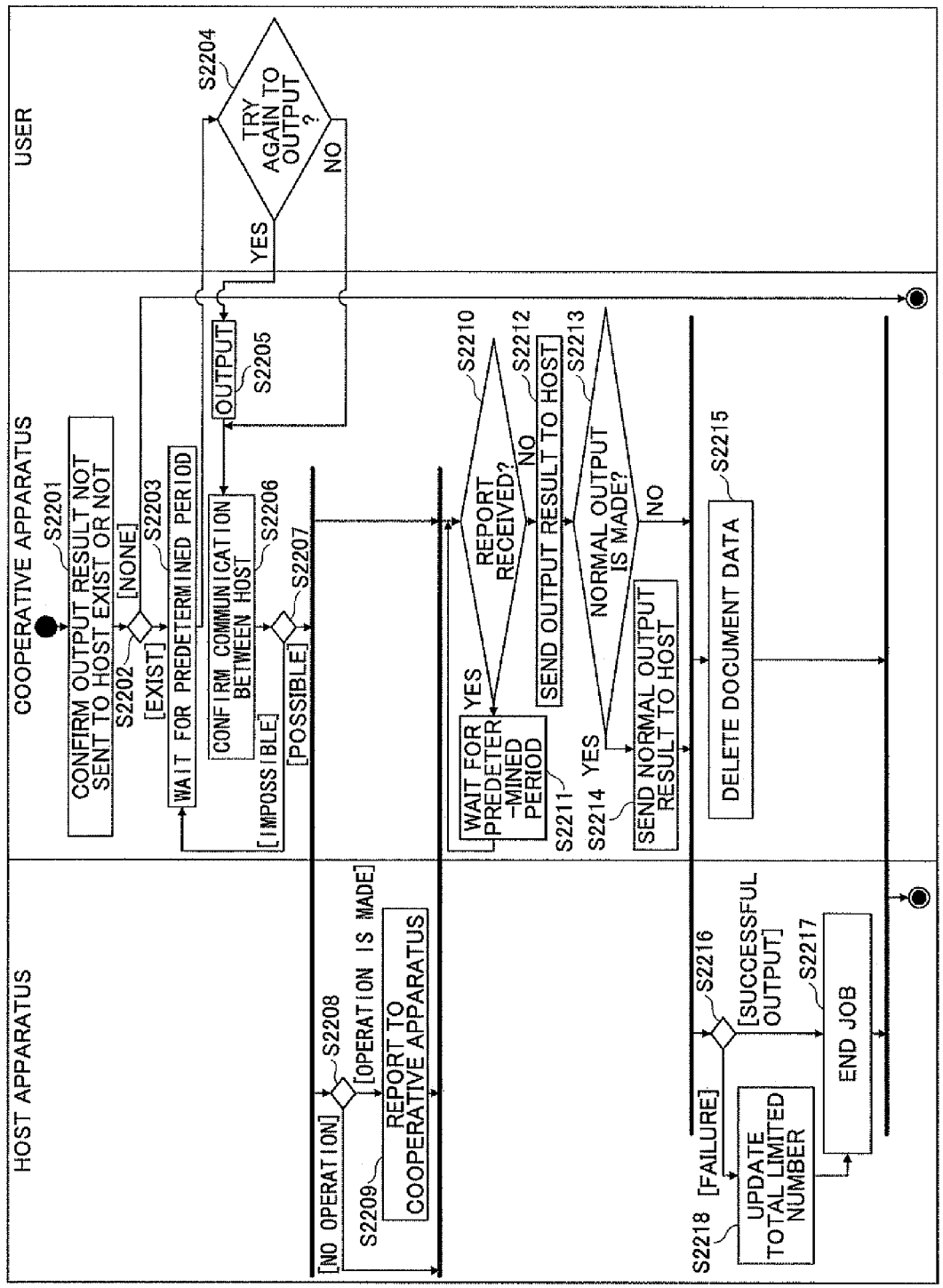
FIG. 22 is a flowchart showing the operations of the image processing system of the embodiment.

The operations of the image processing system 100F of this embodiment will be explained with reference to FIG. 22. FIG. 22 is a flowchart showing the operation of the image processing system 100F of the seventh embodiment.

Operations of step S2201 to step S2207 in FIG. 22 are same as those of step S1601 to step S1607 in FIG. 16, and therefore, explanations are not repeated. Further, operations of step S2213 to step S2218 in FIG. 22 are same as those of step S1609 to step S1614 in FIG. 16, and therefore, explanations are not repeated.

When the communication with the host apparatus 200C becomes possible in step S2207, the cooperative apparatus 300E reports the fact to the host apparatus 200C.

Upon receiving the report, the operation reporting unit 295 of the host apparatus 200C determines whether the operation on the document data to be output under the cooperative output operation is performed in the host apparatus 200C (step S2208). When the operation on the document data to be output is not performed in step S2208, the process proceeds to step S2216, which will be explained later.

When the operation on the document data to be output is performed in step S2208, the operation reporting unit 295 sends a report that the operation on the document data is being performed to the cooperative apparatus 300E (step S2209).

The operation status determining unit 371 of the cooperative apparatus 300E determines whether the report that the operation on the document data is being performed in the host apparatus 200C is received (step S2210). When such a report is received in step S2210, the operation status determining unit 371 has cooperative apparatus 300E wait for the predetermined period without sending the output result (step S2211). When such the report is not received in step S2210, the communication unit 395 of the cooperative apparatus 300E sends the output result to the host apparatus 200C (step S2212).

As described above, according to the present embodiment, the cooperative apparatus 300E does not send the output result to the host apparatus 200C while the operation on the document data is being performed in the host apparatus 200C. Therefore, the document data is not deleted while the operation on the document data is being performed in the host apparatus 200C, and therefore, the deletion of the document data at the undesired timing for the user can be prevented.

The above described functions of the image processing system may be actualized by a program recorded on a non-transitory computer-readable recording medium as follows.

According to an embodiment, there is provided a non-transitory computer-readable recording medium having recorded thereon a program that causes a computer composing a host image processing apparatus, a host apparatus connected with another cooperative image processing apparatus, a cooperative apparatus, to execute an image processing method including: sending to the cooperative image processing apparatus document data to be output, for which a total limited number of output times is set, with output setting information including an allocated number of output times individually allocated for the cooperative image processing apparatus; and updating the total limited number of output times set for the document data based on the allocated number of output times for the document data individually allocated for the cooperative image processing apparatus by subtracting the allocated number of output times from the total limited number of output times, when the document data with the output setting information is sent to the cooperative image processing apparatus.

According to an embodiment, there is provided a non-transitory computer-readable recording medium having recorded thereon a program that causes a computer composing a cooperative image processing apparatus, a cooperative apparatus connected with another host image processing apparatus, a host apparatus, to execute an image processing method including: storing document data to be output with output setting information including an allocated number of output times for the document data individually allocated for the cooperative image processing apparatus sent from the host image processing apparatus; outputting the document data; updating the allocated number of output times by subtracting the number of output times every time the document data is output; and sending the output result of the document data including the updated allocated number of output times to the host image processing apparatus.

According to the above structure of the embodiments, the total limited number of output times set for the document data can be properly controlled.

The present invention is not limited to the specifically disclosed embodiments, and variations and modifications may be made without departing from the scope of the present invention.

The present application is based on Japanese Priority Application No. 2010-267734 filed on Nov. 30, 2010, the entire contents of which are hereby incorporated herein by reference.

What is claimed is:

1. An image processing apparatus having a function to cooperatively output, via a cooperative image processing apparatus, document data for which a total limited number of output times is set, comprising:
    a data sending unit that sends to the cooperative image processing apparatus the document data to be output, for which the total limited number of output times is set, with output setting information including an allocated number of output times for the document data individually allocated for the cooperative image processing apparatus; and
    a number updating unit that updates the total limited number of output times set for the document data based on the allocated number of output times for the document data individually allocated for the cooperative image processing apparatus by subtracting the allocated number of output times from the total limited number of output times, when the data sending unit sends the document data with the output setting information to the cooperative image processing apparatus, wherein
        the number updating unit receives an output result including a failure number of output times that indicates the number of times the cooperative image processing apparatus cannot output the document data sent from the data sending unit because of failure and updates the total limited number of output times set for the document data by adding the failure number of output times when the failure number of output times is not zero.

2. The image processing apparatus according to claim 1, further comprising a capacity detecting unit that detects whether the cooperative image processing apparatus has an available capacity enough for storing the document data before sending the document data to the cooperative image processing apparatus and decides to send the document data with the output setting information of the document data when the cooperative image processing apparatus has the available capacity enough for storing the document data.

3. The image processing apparatus according to claim 1, wherein the data sending unit sends a property of the document data with the document data.

4. The image processing apparatus according to claim 1, further comprising:
    an operations unit that accepts an operation on the document data to be output by a user; and an operation reporting unit that reports the fact that the operation on the document data is performed by the operations unit to the cooperative image processing apparatus.

5. An image processing apparatus having a function to cooperatively output document data for which a total limited number of output times is set with a host image processing apparatus, comprising:
- a data storing unit that stores document data to be output with output setting information including an allocated number of output times for the document data individually allocated for the image processing apparatus sent from the host image processing apparatus;
- an output unit that outputs the document data;
- a number updating unit that updates the allocated number of output times by subtracting the number of output times every time the document data stored in the data storing unit is output by the output unit;
- a communication unit that sends an output result of the document data including the updated allocated number of output times updated by the number updating unit to the host image processing apparatus;
- a communication detecting unit that detects whether the communication with the host image processing apparatus is possible, wherein
  - the output unit outputs the document data in accordance with an initial instruction to output the document data by the host image processing apparatus under a cooperative output operation, and
  - the output unit outputs the document data stored in the data storing unit, the output of which by the initial instruction has once ended in failure, in accordance with an additional instruction to output the document data; and
- an operation status determining unit that determines whether an operation related to the additional instruction to output the document data is performed, wherein the communication unit does not send the output result to the host image processing apparatus when the operation status determining unit determines that the operation related to the additional instruction is being performed, wherein
  - the communication unit sends the output result to the host image processing apparatus when the communication detecting unit detects that the communication with the host image processing apparatus is possible, and
  - the document data stored in the data storing unit is not deleted when the communication detecting unit detects that communication with the host image processing apparatus is not possible due a failure at the cooperative apparatus.

6. The image processing apparatus according to claim 5, further comprising a data deleting unit that deletes the document data stored in the data storing unit when the output result is sent to the host image processing apparatus by the communication unit.

7. The image processing apparatus according to claim 5, further comprising a report monitor unit that detects the output result that is not yet sent to the host image processing apparatus, wherein the communication unit sends the output result detected by the report monitor unit to the host image processing apparatus.

8. The image processing apparatus according to claim 7, further comprising a timer that counts a predetermined period, wherein the communication unit sends the output result detected by the report monitor unit when the predetermined period has passed after the report monitor unit detects the output result that is not yet sent to the host image processing apparatus.

9. The image processing apparatus according to claim 5, further comprising a document data sending unit that sends the document data to the host image processing apparatus when the document data is not stored in the storage area of the host image processing apparatus.

10. The image processing apparatus according to claim 9, wherein the data storing unit stores a property of the document data in correspondence with the document data, and the document data sending unit sends the property of the document data with the document data to the host image processing apparatus.

11. An image processing system comprising:
- a host image processing apparatus and a cooperative image processing apparatus, and having a cooperative output function in which output of a document data, for which a total limited number of output times for limiting the number of output times is set, is cooperatively performed by the host image processing apparatus and the cooperative image processing apparatus, wherein
- the host image processing apparatus includes
- a data sending unit that sends to the cooperative image processing apparatus document data to be output, for which the total limited number of output times is set, with output setting information including an allocated number of output times for the document data individually allocated for the cooperative image processing apparatus; and
- a number updating unit that updates the total limited number of output times set for the document data based on the allocated number of output times individually allocated for the cooperative image processing apparatus by subtracting the allocated number of output times from the total limited number of output times, when the data sending unit sends the document data with the output setting information to the cooperative image processing apparatus, wherein the number updating unit receives an output result including a failure number of output times that indicates the number of times the cooperative image processing apparatus cannot output the document data sent from the data sending unit because of failure and updates the total limited number of output times set for the document data by adding the failure number of output times when the failure number of output times is not zero, and
- the cooperative image processing apparatus includes
- a data storing unit that stores the document data to be output with the output setting information sent from the host image processing apparatus;
- an output unit that outputs the document data;
- a number updating unit that updates the allocated number of output times by subtracting the number of output times every time the document data stored in the data storing unit is output; and
- a communication unit that sends the output result of the document data including the updated allocated number of output times updated by the number updating unit to the host image processing apparatus.

* * * * *